United States Patent
Hashima et al.

(10) Patent No.: US 9,301,443 B2
(45) Date of Patent: Apr. 5, 2016

(54) WORK VEHICLE

(71) Applicant: Kanzaki Kokyukoki Mfg. Co., Ltd., Amagasaki, Hyogo (JP)

(72) Inventors: Hiroaki Hashima, Hyogo (JP); Hongkun Wang, Hyogo (JP)

(73) Assignee: KANZAKI KOKYUKOKI MFG. CO., LTD (JP)

( * ) Notice: Subject to any disclaimer, the term of this patent is extended or adjusted under 35 U.S.C. 154(b) by 117 days.

(21) Appl. No.: 13/799,933

(22) Filed: Mar. 13, 2013

(65) Prior Publication Data

US 2013/0268165 A1    Oct. 10, 2013

(30) Foreign Application Priority Data

Mar. 13, 2012   (JP) ................. 2012-055427
Mar. 13, 2012   (JP) ................. 2012-055975

(51) Int. Cl.
*A01D 34/00*      (2006.01)
*B60W 10/30*     (2006.01)
(Continued)

(52) U.S. Cl.
CPC ............ *A01D 34/006* (2013.01); *B60W 10/08* (2013.01); *B60W 10/30* (2013.01); *B60W 30/18* (2013.01);
(Continued)

(58) Field of Classification Search
CPC . A01D 34/0006; A01D 69/02; A01D 69/025; A01D 34/006; B60W 30/18; B60W 10/08; B60W 10/30; B60W 30/1886; B60W 2300/156; B60W 2510/305; B60W 2710/30; B60W 2520/10; B60Y 2200/223

USPC ........................................................... 701/50
See application file for complete search history.

(56) References Cited

U.S. PATENT DOCUMENTS 5,394,678 A  * 3/1995 Lonn ............... A01D 34/475 56/10.2 H
6,427,107 B1 * 7/2002 Chiu et al. .................. 701/50
(Continued)

FOREIGN PATENT DOCUMENTS

EP           0510279  A1    10/1992
JP           05161043  A     6/1993
(Continued)

OTHER PUBLICATIONS

Japanese Office Action corresponding to Application No. 2012-055427; Date of Mailing: Oct. 20, 2015, with Eglish translation.

*Primary Examiner* — Helal A Algahaim
*Assistant Examiner* — Genna Mott
(74) *Attorney, Agent, or Firm* — Cantor Colburn LLP

(57) ABSTRACT

A work vehicle includes a driving wheel motor for driving at least one driving wheel, a working implement-related motor for driving at least one working implement, and at least one controller. The at least one controller sets, upon satisfaction of a predetermined condition set in advance, a relationship between vehicle speed of the work vehicle and working implement-related target rotational speed of the working implement-related motor to a working travelling cooperative relationship according to which the working implement-related target rotational speed is increased according to an increase in the vehicle speed at least within a predetermined vehicle speed range of the work vehicle, and controls the working implement-related motor to implement a working travelling cooperative mode in which the working implement-related motor is driven at the working implement-related target rotational speed based on the working travelling cooperative relationship.

6 Claims, 15 Drawing Sheets

(51) Int. Cl.
  *B60W 30/188* (2012.01)
  *B60W 10/08* (2006.01)
  *B60W 30/18* (2012.01)

(52) U.S. Cl.
  CPC ..... *B60W 30/1886* (2013.01); *B60W 2300/156* (2013.01); *B60W 2510/305* (2013.01); *B60W 2520/10* (2013.01); *B60W 2710/30* (2013.01); *B60Y 2200/223* (2013.01)

(56) References Cited

U.S. PATENT DOCUMENTS

| | | | |
|---|---|---|---|
| 6,434,918 | B1 | 8/2002 | Csonka et al. |
| 6,745,117 | B1 * | 6/2004 | Thacher et al. ............ 701/50 |
| 6,948,299 | B2 | 9/2005 | Osborne |
| 8,055,399 | B2 | 11/2011 | Wyatt et al. |
| 2005/0126145 | A1 | 6/2005 | Hunt et al. |
| 2007/0012013 | A1 * | 1/2007 | Strosser et al. ............ 56/10.2 R |
| 2008/0046154 | A1 * | 2/2008 | Bares .................. A01D 46/085 701/50 |
| 2009/0065273 | A1 | 3/2009 | Wyatt et al. |
| 2009/0069964 | A1 | 3/2009 | Wyatt et al. |
| 2009/0201650 | A1 | 8/2009 | Hauser et al. |
| 2010/0287900 | A1 * | 11/2010 | Ringwald et al. .............. 56/17.1 |
| 2012/0181848 | A1 | 7/2012 | Makino et al. |

FOREIGN PATENT DOCUMENTS

| | | | |
|---|---|---|---|
| JP | 2006507789 | A | 3/2006 |
| JP | 2008263921 | A | 11/2008 |
| JP | 2009278811 | A | 11/2009 |
| JP | 2011079484 | A | 4/2011 |
| JP | 2011142842 | A * | 7/2011 |
| JP | 2011223696 | A | 11/2011 |
| JP | 2012023837 | A | 2/2012 |

* cited by examiner

WORK VEHICLE

PRIORITY INFORMATION

This application claims priority to Japanese Patent Applications No. 2012-055427 filed on Mar. 13, 2012 and No. 2012-055975 filed on Mar. 13, 2012, both of which are incorporated herein by reference in their entirety.

BACKGROUND

1. Technical Field

The present invention relates to a work vehicle including a driving wheel motor for driving at least one driving wheel, a working implement-related motor for driving at least one working implement, and at least one controller.

2. Related Art

Riding mowers including a working implement which is driven to perform mowing are conventionally known. Also, there are conceivable riding mowers, such as the riding mowers mentioned above, including left and right wheels which are main driving wheels that are driven by independent or common motors such as electric motors, hydraulic motors or the like, and a steering wheel such as a caster wheel.

For example, there is a riding mower capable of autonomous travelling that a worker rides and maneuvers to travel and mow from behind the wheel, and this is called a riding mower vehicle. As a mower, there is a mowing rotary tool or the like, for example.

The riding mower vehicle is used exclusively off the road, such as in the garden, and moves on the ground to perform mowing.

For example, Japanese National Publication of International Patent Application No. 2006-507789 discloses hybrid power equipment incorporating an integral engine/generator arrangement where a rotor is coupled to an engine shaft of an internal combustion engine. It is stated therein that, according to a mower described as the power equipment, independent electric motors are coupled to a plurality of driving wheels, respectively, each driving wheel can be independently controlled at variable speed, and smooth start, stop, speed change, direction change and turning of the mower are thereby enabled. Regarding an example of turning by independent speed change of a driving wheel, coupling of an electric motor to each of left and right rear wheels is described.

Conventionally, there is a case where a mower of a riding mower is switched between being driven and being stopped by a deck switch which is a mower start switch being switched between on and off. However, only one mode can be selected when the deck switch is turned on. That is, the mower rotates at a constant rotational speed regardless of the vehicle speed. Also, the vehicle speed is set according to an operation, by a user, of an operator such as an operation lever or an accelerator pedal. Accordingly, in the case where the vehicle speed is high, the resistance of the lawn grass is great, and there is a possibility that performing mowing once will not be enough to obtain a neat lawn, i.e. a desirable state of lawn where most of the lawn grass is cut to a desirable length. With respect to this point, it is conceivable to sufficiently increase the rotational speed of the mower, but in this case, wasteful, excessive rotation is caused, resulting in greater consumption of fuel and electrical power, and this is not desirable from the point of view of energy saving. Therefore, realization of a riding mower capable of obtaining a fine lawn with an efficient operation while saving energy is desired. The structures described in the specifications of Japanese National Publication of International Patent Application No. 2006-507789, US Patent Application Publication No. 2005/0126145 A1, US Patent Application Publication No. 2009/0065273 A1, US Patent Application Publication No. 2009/0069964 A1, US Patent Application Publication No. 2009/0201650 A1 and U.S. Pat. No. 8,055,399 B2 have room for improvement in order to realize a desirable state of lawn with an efficient operation while saving energy.

SUMMARY

An advantage of the present invention regarding a work vehicle is that power saving can be achieved, and that a structure capable of obtaining a desirable after-operation state, for example, a lawn state, with an efficient operation can be realized.

A first work vehicle according to the present invention is a work vehicle including a driving wheel motor for driving at least one driving wheel, a working implement-related motor for driving at least one working implement, and at least one controller, wherein the at least one controller sets, upon satisfaction of a predetermined condition set in advance, a relationship between vehicle speed of the work vehicle and working implement-related target rotational speed of the working implement-related motor to a working travelling cooperative relationship according to which the working implement-related target rotational speed is increased according to an increase in the vehicle speed at least within a predetermined vehicle speed range of the work vehicle, and controls the working implement-related motor to implement a working travelling cooperative mode in which the working implement-related motor is driven at the working implement-related target rotational speed based on the working travelling cooperative relationship.

Also, a second work vehicle according to the present invention is a work vehicle including a driving wheel motor for driving at least one driving wheel, a working implement-related motor for driving at least one working implement, at least one controller, at least one operator sensor for detecting an amount of operation of at least one operator, a mode instruction device for instructing switching between an economy mode and at least one other drive mode based on an operation of a user, and a working implement start switch for instructing start of the working implement-related motor based on an operation of a user, where the at least one controller includes a vehicle speed calculation unit for calculating target vehicle speed of the work vehicle based on a signal from the at least one operator sensor, a drive control unit for controlling operation of the driving wheel motor based on a signal from the at least one operator sensor, and a working implement-related control unit for controlling operation of the working implement-related motor, and wherein, when switching to the economy mode is performed by the mode instruction device, and the working implement start switch is turned on, the drive control unit changes allowable maximum speed of the target vehicle speed of the work vehicle to an economic maximum speed that is lower than when switching to the other drive mode is performed, and controls rotational speed of the driving wheel motor, and the working implement-related control unit controls the working implement-related motor to rotate at a constant speed set in advance.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF EXEMPLARY EMBODIMENTS

Figure 1:
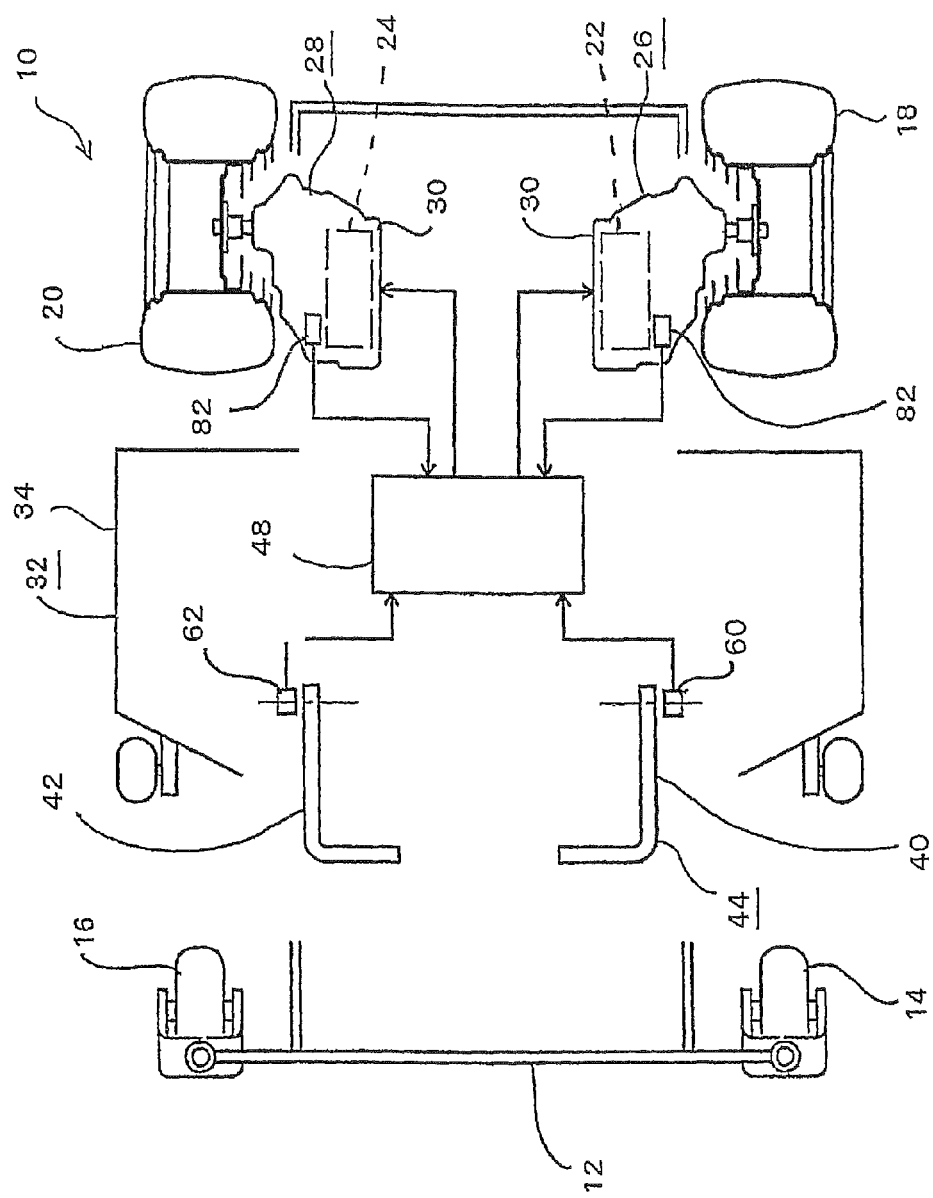
FIG. 1 is a schematic view of a structure, seen from above, of a riding mower of an embodiment.

Hereinafter, an embodiment according to the present invention will be described in detail based on the drawings. FIGS. 1 to 7 show one embodiment of the present invention. FIG. 1 is a schematic view of a structure, seen from above, of a riding mower of the embodiment according to the present invention. Additionally, FIG. 1 shows a case where a left/right lever-type operator 44 including two, left and right operation levers 40 and 42 is used as a structure having the functions of both a turning instruction device and an acceleration instruction device, but it is also possible to use a steering operator which is a steering handle as the turning instruction device, and an accelerator pedal which is an operator provided at the front side of a seat as the acceleration instruction device. Also, a case is described below where three deck motors are provided on a riding mower 10, but one, two, or four or more deck motors may be provided on the riding mower.

As shown in FIG. 1, the riding mower 10, which is a riding ground work vehicle on which an engine is not mounted, is an autonomous off-road vehicle suitable for mowing, and includes, in a supported manner, two left and right caster wheels 14 and 16, and two left and right wheels 18 and 20, at positions separate in the longitudinal direction of a main frame 12 (in the left and right direction in FIG. 1). The left and right caster wheels 14 and 16 are front wheels and are steering wheels. The two left and right wheels 18 and 20 are rear wheels and are main driving wheels. The left and right wheels 18 and 20 are independently driven by a left or right drive motor 22 or 24 which is an electric motor for the driving wheel, as an electric rotary machines for travelling. That is, the left and right drive motors 22 and 24 are connected to the left and right wheels 18 and 20, respectively, via power transmission units including reduction mechanisms, not shown, so as to be able to transmit power.

The vehicle is allowed to travel straight by causing the rotational speed of the left and right wheels 18 and 20 to coincide with each other using the left and right drive motors 22 and 24, and the vehicle is allowed to make a turn by causing a difference to occur in the rotational speed of the left and right wheels 18 and 20. As described, the riding mower 10 includes the drive motors 22 and 24 as driving sources. Also, a reduction gear device including one or more stages is used as the reduction mechanism provided in the power transmission unit, for example. In FIG. 1, power generation units 26 and 28 are provided corresponding to the left and right wheels 18 and 20, and the drive motor 22 or 24 and a reduction mechanism, not shown, are provided in a housing 30 constituting the power generation unit 26 or 28. Each housing 30 is supported on the main frame 12. Additionally, a structure may be adopted for the left and right wheels 18 and 20 according to which the power of the drive motors 22 and 24 is transmitted without using the reduction mechanisms and without reducing the speed. Also, the caster wheels 14 and 16 allow steering of 360 degrees or more around shafts placed in the vertical direction (the front-back direction of FIG. 1).

The riding mower 10 includes a mower 32, which is a working implement supported at a middle portion in the longitudinal direction of the main frame 12 on the lower side thereof. The mower includes, inside a mower deck 34, one or more mower blades, not shown, which are mowing rotary tools capable of rotating around a vertical axis. The mower blade includes a plurality of cutting blade elements arranged around the vertical axis, and is enabled to perform mowing by rotating the cutting blade elements and cutting the lawn grass or the like.

Furthermore, each of the drive motors 22 and 24 described above is supplied with electrical power by a battery 36 (FIG. 2, etc.) which is a power source, and is driven. The battery 36 may be a lead acid battery, a nickel-metal-hydride battery, a lithium battery or the like, and may have voltage of 48 V, for example. The battery 36 may also be charged by an external commercial AC source via a charger.

Additionally, the riding mower 10 may be a so-called hybrid type including an engine and a generator. In this case, the generator is made to generate electrical power using the power of the engine, and the generated electric power may be supplied to the battery 36. Moreover, a fuel cell, a solar cell and the like, having a self-generation function, may be used together with the battery 36, which is supplied with charging power from outside, as the power source. Also, other power sources, such as a capacitor, may be used instead of the battery 36.

Figure 2:
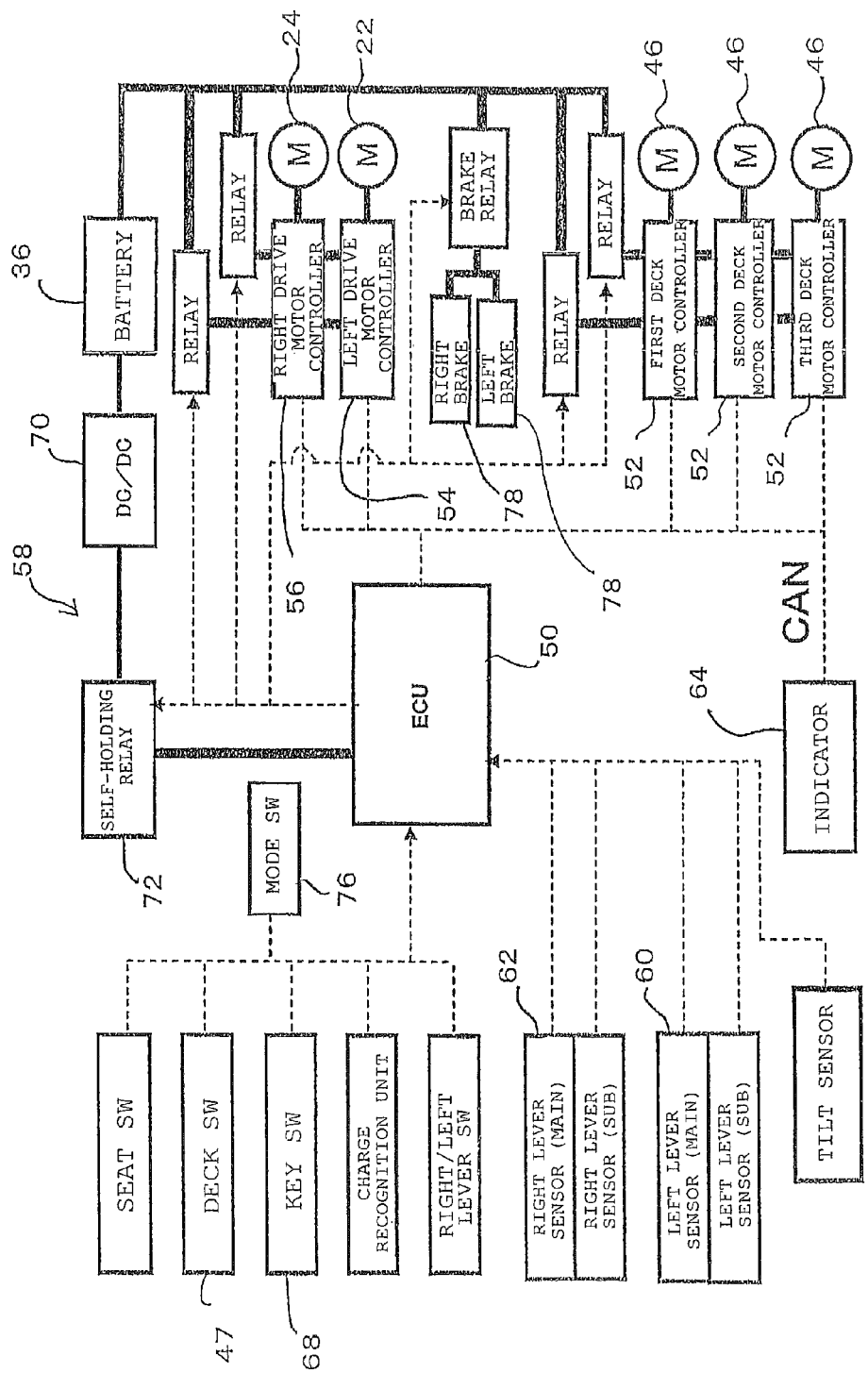
FIG. 2 is a block diagram showing a structure of a control system of the riding mower in FIG. 1.

Furthermore, a rotating shaft, not shown, of a deck motor 46 (FIG. 2), which is an electric motor and which is a corresponding mower-related motor, is coupled to a rotating shaft of the mower blade, not shown, provided inside the mower deck 34, in such a manner as to be able to transmit power. Additionally, FIG. 2 shows a case where three deck motors 46 are provided. Each deck motor 46 is supplied with electric power by the battery 36 (FIG. 2).

FIG. 2 is a block diagram showing a structure of a control system of the riding mower in FIG. 1. As shown in FIG. 2, a deck switch 47, which is a mower start switch for instructing start of the deck motor 46 based on an operation of a user, is provided near a seat, not shown, provided on the upper side of the main frame 12 (FIG. 1). When a signal indicating on or off of the deck switch 47 is input to an electronic control unit (ECU) 50, which is a higher level controller constituting a controller unit 48 (FIG. 1), the ECU 50 outputs, based on this signal, an instruction signal to one or more deck motor controllers 52, which are lower level controllers, and controls the operation state of each deck motor 46. That is, the deck motor controller 52 includes a deck inverter (not shown), which is a driver for driving the deck motor 46, and a control circuit (not shown) for controlling the deck inverter. The control circuit of the deck motor controller 52 includes a CPU and a storage unit, such as a memory, and a signal indicating a target number of revolutions per unit time, which is target rotational speed of the deck motor 46, is input to the deck inverter from the ECU 50. Each deck inverter controls the corresponding deck motor 46 to rotate at the target number of revolutions per unit time. Each deck motor controller 52 is connected to the ECU 50 by a CAN communication line.

Returning to FIG. 1, the riding mower 10 mows the lawn by being driven by the deck motor 46 (FIG. 2), and ejects the cut grass from within the mower deck 34 to a side of the vehicle in the width direction. Additionally, by installing a grass collecting tank, not shown, in the riding mower 10 and connecting the grass collecting tank and the mower deck 34 by a duct, the cut grass may be collected in the grass collecting tank.

Additionally, as the mowing rotary tool, which is a mower, a reel type which has, for example, blades spirally arranged on a cylinder having a rotating shaft that is parallel to the ground and has a structure for performing mowing by snipping the grass or the like, and which is driven by a deck motor, may also be used, instead of the mower blade type.

Furthermore, the left and right caster wheels 14 and 16 are supported at the same position with respect to the longitudinal direction (the left and right direction in FIG. 1) on the front side (the left side in FIG. 1) of the main frame 12. Also, a seat, not shown, is provided on the upper surface side at a middle portion in the left to right direction (the up and down direction in FIG. 1) at a middle portion in the front to back direction of the main frame 12. Additionally, in the present specification, the front side refers to the front side of the vehicle, which is the left side in FIG. 1, and the rear side refers to the rear side of the vehicle, which is the right side in FIG. 1. Moreover, the left and right wheels 18 and 20 are supported at the same position with respect to the front to back direction at the rear side of the main frame 12. The main frame 12 may be formed of a metal material, such as steel, and may be formed into a beam structure or the like. A support portion, such as a plate portion, is fixed on the upper side of the main frame 12, not shown, for supporting the seat, the operators, such as the left and right operation levers 40 and 42, and the like.

Additionally, the number of the caster wheels 14 and 16 is not limited to two, and one caster wheel may be provided on the riding mower 10, or a plurality of caster wheels, such as three or more, may be provided on the riding mower 10, for example. Additionally, in the present embodiment, the left and right wheels 18 and 20, which are the main driving wheels, are assumed to be the rear wheels, and the caster wheels 14 and 16 are assumed to be the front wheels, but the left and right wheels 18 and 20, as the main driving wheels, may be made the front wheels, and the caster wheels 14 and 16 may be made the rear wheels.

Furthermore, the drive motors 22 and 24 have the function of outputting a rotational driving force to the wheels 18 and 20 when electrical power is supplied, but they may also serve the function of generators for collecting regenerative energy when braking is applied on the wheels. The drive motors 22 and 24 are three-phase permanent magnet synchronous electric motors, induction motors or the like, for example.

The controller unit 48 described above is provided in the riding mower 10, and the ECU 50 (FIG. 2), which is the higher level controller and which performs overall control of the drive motors 22 and 24 and the deck motor 46 (FIG. 2), and a left drive motor controller 54 and a right drive motor controller 56 (FIG. 2), which are lower level controllers and which correspond to the left and right drive motors 22 and 24, respectively, are provided in the controller unit 48 in an integrated manner. As shown in FIG. 2, each of the drive motor controllers 54 and 56 is connected to the ECU 50 by a CAN communication line, which is a signal cable. The deck motor controller 52 may be provided integrally with the controller unit 48, and the motor controllers 52, 54 and 56 and the ECU 50 may be arranged in the riding mower 10 in a separated manner.

A control system 58 shown in FIG. 2 is mounted on the riding mower 10, and the control system 58 includes the left and right drive motors 22 and 24 and three deck motors 46, left and right lever sensors 60 and 62, which are a plurality of operator sensors, the ECU 50 and the motor controllers 52, 54 and 56, which are a plurality of controllers, the battery 36 and an indicator 64. The battery 36 supplies electrical power to each of the drive motors 22 and 24 and each of the deck motors 46.

A positive pole electric line and a negative pole electric line connected to the positive side and the negative side of the battery 36 are each connected via a relay to the positive side or the negative side of an inverter (not shown) which is a left or right driving wheel driver. The left and right inverters are each provided as a part of the right drive motor controller 56 or the left drive motor controller 54 connected to the battery 36. That is, each of the drive motor controllers 54 and 56 includes an inverter and an inverter control circuit (not shown), having a CPU, for controlling the inverter. Each inverter is connected to the corresponding drive motor 22 or 24, and drives the drive motor 22 or 24.

Each inverter includes a three-phase arm having two switching elements, such as transistors, IGBTs or the like, connected in series. Also, each inverter control circuit is capable of controlling switching of each switching element according to input, from the ECU 50, of a rotational speed instruction signal, which is an instruction signal regarding the number of revolutions of a motor per unit time, and of driving the corresponding drive motor 22 or 24 at the rotational speed according to the rotational speed instruction signal. That is, the ECU 50 transmits control signals to the drive motor controllers 54 and 56. The ECU 50 includes a control circuit unit having a CPU, a storage unit, such as a memory, and the like.

As shown in FIG. 1, there is provided the left/right lever-type operator 44 including two left and right operation levers 40 and 42 provided on both sides in the left to right direction, which is the width direction of the seat of the riding mower 10. The left and right lever sensors 60 and 62 for detecting the amount of operation and the operation direction of the left/right lever-type operator 44 are provided in the control system 58 in FIG. 2, and detection signals of the left and right lever sensors 60 and 62 are input to the ECU 50. In FIG. 2, the lever sensors 60 and 62 each include a main sensor and a sub sensor, and in the case where the difference between the main sensor and the sub sensor of the corresponding lever sensor 60 or 62 reaches or exceeds a threshold set in advance, the ECU 50 may identify an abnormality in the sensor value and perform control to reduce the vehicle speed or stop the vehicle. Also, in the event that the ECU 50 identifies an abnormality in the vehicle, the indicator 64 may notify a user of the abnormality by displaying the occurrence of the abnormality or by a lighting unit or the like. Moreover, the indicator 64 may also serve the function of displaying charging of the battery 36 by an external AC source. Additionally, in the case of using a steering operator as the turning instruction device, a detection signal of a steering sensor for detecting the amount of operation and the operation direction of the steering operator is input to the ECU 50. Also, in the case of using an accelerator pedal as the acceleration instruction device, which is an operator, a detection signal of an accelerator sensor for detecting the amount of operation of the accelerator pedal is input to the ECU 50.

Figure 4:
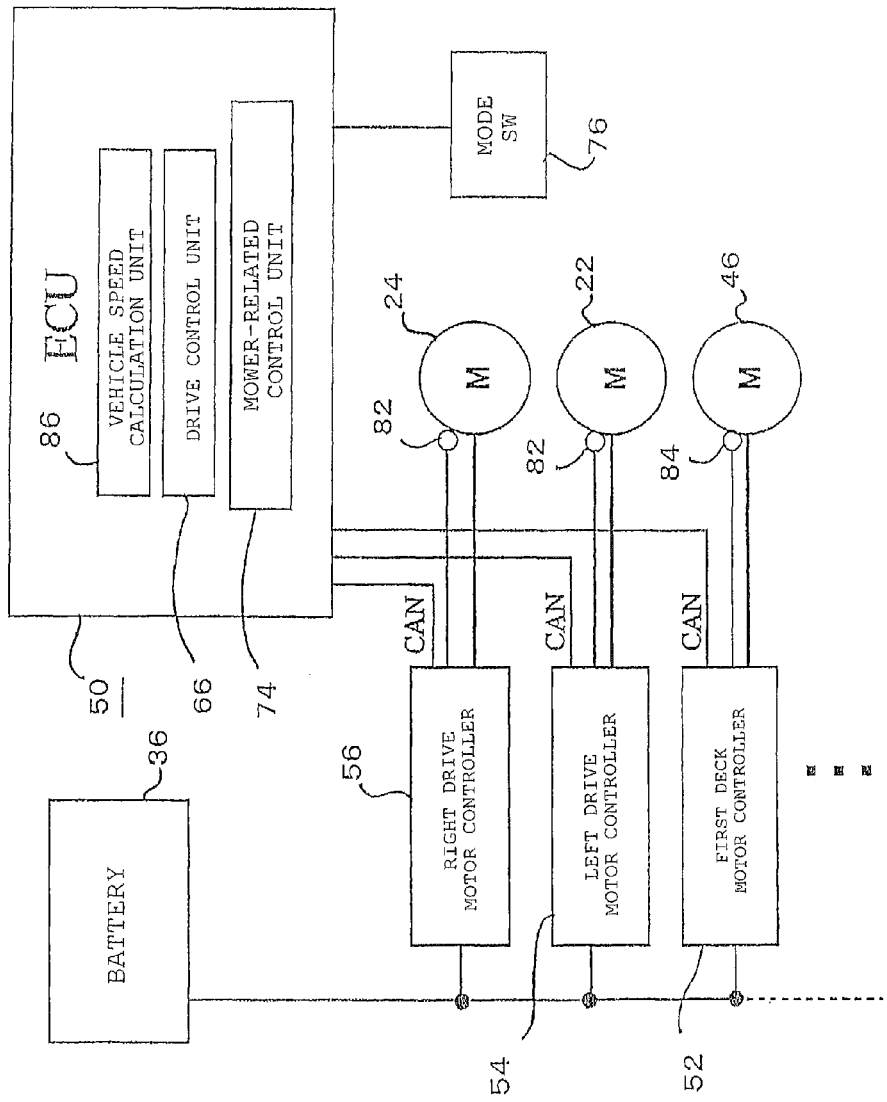
FIG. 4 is a block diagram showing a structure of the ECU in FIG. 3 in detail.

As shown in FIG. 4 described later, the ECU 50 includes a drive control unit 66. The drive control unit 66 calculates the target rotational speed of the left and right drive motors 22 and 24 based on the detection signals of the left and right lever sensors 60 and 62 (FIG. 2) (or the steering sensor and the accelerator sensor) to cause the vehicle to travel in a corresponding direction at a corresponding speed. Also, the drive control unit 66 transmits the target rotational speed of each of the drive motors 22 and 24 to the corresponding drive motor controller 54 or 56, and each of the drive motor controllers 54 and 56 controls the operation of the corresponding drive motor 22 or 24 via the corresponding inverter. In this manner, the drive control unit 66 controls the operation of the left or right drive motor 22 or 24 via the drive motor controller 54 or 56 based on a signal from the lever sensor 60 or 62, which is at least one operator sensor. Additionally, the ECU 50 may be configured to calculate, at a target torque calculation unit, target torque of the left and right drive motors 22 and 24 based on the detection signals of the left and right lever sensors 60 and 62 (or the steering sensor and the accelerator sensor) to cause the vehicle to travel in a corresponding direction at a corresponding speed. In this case, the ECU 50 transmits the target torque of each of the drive motors 22 and 24 to the corresponding drive motor controller 54 or 56, and controls the operation of each of the drive motors 22 and 24. In the present application, the "rotational speed" includes both the general meaning of rotational speed and the meaning "the number of revolutions per unit time" (the same applies in the following).

Furthermore, as shown in FIG. 2, the battery 36 is connected to the ECU 50 via a DC/DC converter 70 and a switch connection relay, not shown, connected to a key switch 68, which is a main switch, and the voltage of the battery 36 is stepped down by the DC/DC converter 70 and is supplied to the ECU 50. For example, in the case where the voltage of the battery 36 is 48 V, the voltage is stepped down by the DC/DC converter 70 to 12 V and is supplied to the ECU 50, and the ECU 50 is operated, i.e. turned on. Also, a self-holding relay 72, which is switched between on and off by a control signal from the ECU 50, is provided between the battery 36 and the ECU 50, being connected in parallel with the key switch 68. When a key is inserted by a user and the key is turned, the key switch 68 is turned on (or off), and transmits a signal indicating that it has been turned on (or off) to the ECU 50. For example, when the key switch is turned on, electrical power is supplied to the ECU 50 from the battery 36 via the DC/DC converter 70 and the switch connection relay, and the ECU 50 turns on the self-holding relay 72. The self-holding relay 72 is thereby connected between the battery 36 and the ECU 50 so as to be able to supply the electrical power of the battery 36 to the ECU 50. On the other hand, when the key switch 68 is switched from on to off, the switch connection relay is disconnected, but the self-holding relay 72 is switched from on to off and the supply of electric power from the battery 36 to the ECU 50 is interrupted only when all of the drive motors 22 and 24 and the deck motors 46 are stopped. Therefore, even if the key switch 68 is erroneously turned off, as long as at least one of the drive motors 22 and 24 and the deck motors 46 is running, electrical power of the ECU 50 is not immediately cut off. Of course, the self-holding relay 72 may be omitted, and electrical power may be supplied from the battery 36 to the ECU 50 via the DC/DC converter 70 and the key switch 68.

As shown in FIG. 4 described later, the ECU 50 includes a mower-related control unit 74. The mower-related control unit 74 transmits a control signal to each of the deck motor controllers 52 so as to cause the three deck motors 46 to rotate at a high efficiency constant rotational speed set in advance, when the deck switch 47 (FIG. 2) is on and an "economy mode" is selected by a mode switch 76 described later. The mower-related control unit 74 controls the operation of each deck motor 46 via the corresponding deck motor controller 52.

As shown in FIG. 2, the positive pole electric line and the negative pole electric line connected to the positive side and the negative side of the battery 36 are each connected to the positive sides or the negative sides of three inverters (not shown) provided on the three deck motor controllers 52 via a relay. Each deck inverter is connected to the corresponding deck motor 46, and drives the deck motor 46. For example, like each of the drive motors 22 and 24, each deck motor 46 may be a three-phase electric motor or the like.

Each deck inverter may be configured in the same manner as the inverter of each of the drive motor controller 54 and 56 described above. A control circuit of each deck motor controller 52 is capable of controlling switching of each switching element according to input, from the ECU 50, of a rotational speed instruction signal according to the target rotational speed of the deck motor 46, and of driving the corresponding deck motor 46 at the corresponding rotational speed.

To apply braking on each of the wheels 18 and 20 (FIG. 1), the control system 58 includes left and right electromagnetic brakes 78 corresponding to the wheels 18 and 20. Also, a brake pedal, not shown, is provided on the upper surface side of the main frame 12, and a detection signal of a brake sensor for detecting the amount of operation of the brake pedal is input to the ECU 50. By turning on or off a brake relay connected between each electromagnetic brake 78 and the battery 36 according to the signal of the brake sensor, the ECU 50 turns on or off the electromagnetic brake 78 provided in the periphery of the axle of the wheel 18 or 20 to thereby apply or release braking.

Figure 3:
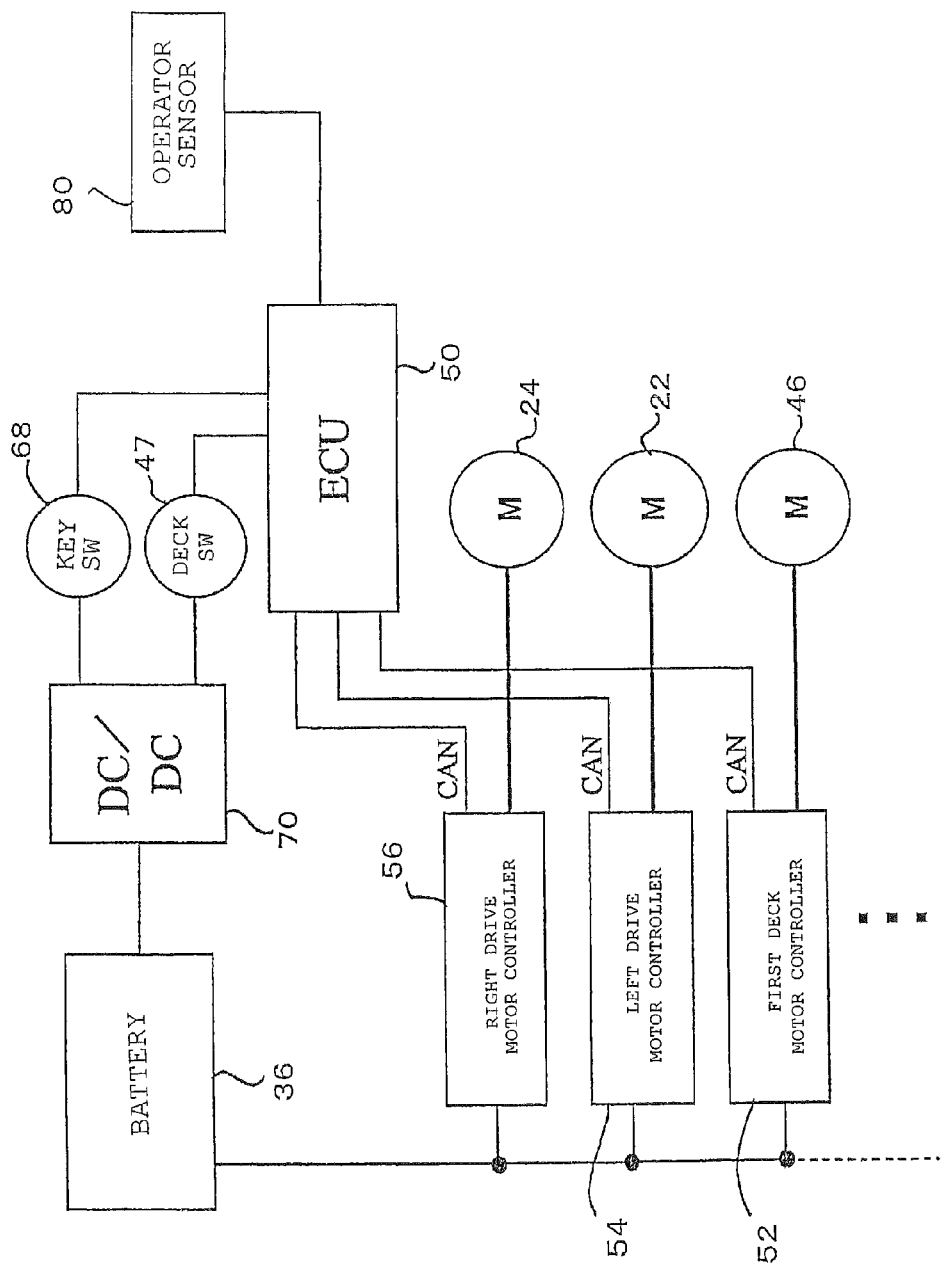
FIG. 3 is a block diagram showing a connection structure of an ECU, a drive motor controller and a drive motor, in the control system in FIG. 2.

FIG. 3 is a block diagram showing a connection structure of the ECU, the drive motor controller and the drive motor according to the present embodiment. FIG. 4 is a block diagram showing a structure of the ECU in FIG. 3 in detail. Additionally, in FIG. 3, the plurality of lever sensors 60 and 62 (FIG. 2) are collectively referred to as an operator sensor 80.

As shown in FIG. 3, a detection signal of the operator sensor 80 and signals indicating the on/off state of the deck switch 47 and the key switch 68 are input to the ECU 50. Also, as shown in FIG. 4, rotational angle sensors 82 and 84 for detecting rotational angles of the drive motors 22 and 24 and the deck motors 46 are provided. Detection signals of the rotational angle sensors 82 and 84 are input to the corresponding motor controllers (the drive motor controllers 54 and 56 and the deck motor controller 52). Each of the motor controllers 52, 54 and 56 includes a calculation unit for calculating the rotational speed of the drive motor 22 or 24 or the deck motor 46 based on the detection value of the rotational angle. Then, a corresponding rotational speed detection unit is configured from the calculation unit of the motor controller 52, 54 or 56 and the corresponding rotational angle sensor. A rotational speed sensor which is a rotational speed detection unit for detecting the rotational speed of the drive motor 22 or 24 or the deck motor 46 may be provided, and a detection signal thereof may be input to the corresponding motor controller 54, 56 or 52. The rotational angle sensor 84 for detecting the rotational angle of the deck motor 46 may be omitted.

As described, the riding mower 10 includes the drive motors 22 and 24 for driving the wheels 18 and 20, which are, respectively, at least one driving wheel, the deck motor 46 for driving at least one mower 32, the ECU 50, which is at least one controller, and a plurality of motor controllers 52, 54 and 56, and the left and right lever sensors 60 and 62, which are, respectively, at least one operator sensor for detecting the amount of operation of the left/right lever-type operator 44, which is at least one operator.

Furthermore, as shown in FIG. 4, the ECU includes a vehicle speed calculation unit 86, the drive control unit 66, and the mower-related control unit 74. The vehicle speed calculation unit 86 calculates the vehicle speed of the riding mower 10 (FIG. 1). For example, the vehicle speed calculation unit 86 calculates actual vehicle speed based on a detection signal regarding the rotational speed of each of the drive motors 22 and 24 from a rotational speed detection unit of the drive motor controller 54 or 56 or the like. Also, the vehicle speed calculation unit 86 calculates target vehicle speed of the riding mower 10 based on a signal from each of the lever sensors 60 and 62. Then, when a speed difference between the target vehicle speed and the actual vehicle speed is at or below threshold speed for vehicle speed calculation set in advance, the vehicle speed calculation unit 86 determines the target vehicle speed or the actual vehicle speed to be the vehicle speed for controlling the rotational speed of the deck motor 46 in a state where a "nice-mode", which is a mowing travelling cooperative mode, is carried out according to an instruction from the mode switch 76 described later, and when the speed difference between the target vehicle speed and the actual vehicle speed exceeds the threshold speed for vehicle speed calculation, the vehicle speed calculation unit 86 determines the actual vehicle speed to be the vehicle speed for controlling the rotational speed of the deck motor 46 in a state where the "nice-mode" is carried out.

A current sensor for detecting a current in one or some or all of the phases connecting each of the drive motors 22 and 24 and each of the deck motors 46 to the corresponding inverter may be provided, and a detection signal of the current sensor may be input to the corresponding motor controller 54, 56 or 52. Each function of the ECU 50 may be realized by software by, for example, executing a program that is stored, or a part or all of the functions may be realized by hardware.

According to such a riding mower 10, the vehicle can be accelerated in the forward direction or the reverse direction by swinging each of the operation levers 40 and 42 of the left/right lever-type operator 44 around a horizontal axis in the width direction of the vehicle. By pressing down the left and right operation levers 40 and 42 to the front, the vehicle can be made to move forward by the rotation of the left and right drive motors 22 and 24 in the forward direction, and by pressing down the left and right operation levers 40 and 42 backward, the vehicle can be made to move backward by the rotation of the left and right drive motors 22 and 24 in the reverse direction. By changing the amount of pressing down between the left and right operation levers 40 and 42, a difference is caused in the number of revolutions of the left and right wheels 18 and 20, and the vehicle can be made to turn.

Particularly, the control system 58 of the riding mower 10 of the present embodiment sets, upon satisfaction of a predetermined condition set in advance, the relationship between the vehicle speed and mower-related target rotational speed to a "mowing travelling cooperative relationship", which is a working travelling cooperative relationship according to which mower-related target rotational speed of the deck motor 46 is increased according to the increase in the vehicle speed of the riding mower 10 at least within a predetermined vehicle speed range of the riding mower 10, and controls each deck motor 46 to carry out a "nice-mode", which is a mowing travelling cooperative mode in which the deck motor 46 is driven at the mower-related target rotational speed based on the "mowing travelling cooperative relationship" described above.

Figure 5:
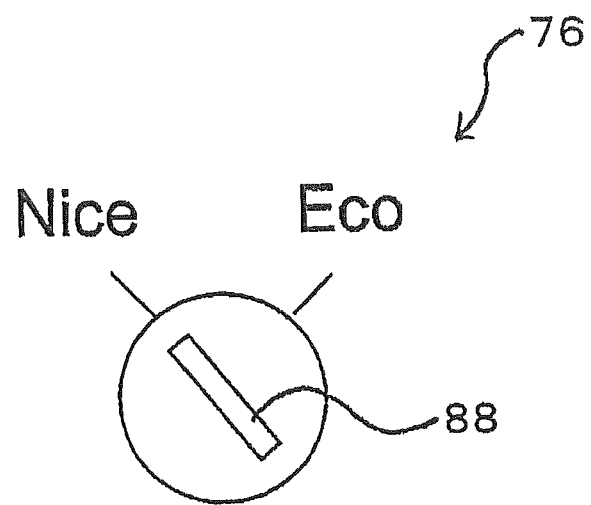
FIG. 5 is a diagram showing an example of a mode switch shown in FIG. 2.

More particularly, the mode switch 76 shown in FIGS. 2 and 4 is provided at a position where it can be operated by a user, for example, on an operation panel or the like provided in front of a seat or in the periphery of a seat on the left or right side or the like. FIG. 5 is a diagram showing an example of the mode switch 76 shown in FIG. 2. As shown in FIG. 5, the mode switch 76 has a knob 88 which can be twisted by fingers, can switch, based on an operation of a user, between the nice-mode (a Nice position in FIG. 5), which is the mowing travelling cooperative mode, and the economy mode (an Eco position in FIG. 5), which is another drive mode, instructs the switching based on an operation of the user, and outputs an instruction signal indicating the instructed mode to the ECU 50 (FIG. 2, etc.). In the following description, an element that is the same, or corresponding to, an element shown in FIGS. 1 to 4 will be denoted with the same reference numeral.

When switching to the nice-mode is performed by the mode switch 76, the mower-related control unit 74 (FIG. 4) of the ECU 50 determines that the predetermined condition mentioned above has been satisfied, and sets the relationship between the vehicle speed of each deck motor 46 and the mower-related target rotational speed to the "mowing travelling cooperative relationship" mentioned above. Then, the mower-related control unit 74 controls each deck motor 46 to carry out the "nice-mode" according to which the deck motor 46 is driven at the mower-related target rotational speed based on the mowing travelling cooperative relationship and the vehicle speed calculated by the vehicle speed calculation unit 86 described above. That is, when switching to the nice-mode is performed, the mower-related control unit 74 transmits to each deck motor controller 52 an instruction signal indicating the mower-related target rotational speed based on the mowing travelling cooperative relationship mentioned above and the vehicle speed, and controls each deck motor 46 via each deck motor controller 52. That is, the ECU 50 selects control logic of the selected mode according to the instruction signal from the mode switch 76.

Furthermore, in the case where the nice-mode is instructed by the mode switch 76, the mower-related control unit 74 calculates the mower-related target rotational speed according to the vehicle speed calculated by the vehicle speed calculation unit 86 described above, based on the mowing travelling cooperative relationship that is set in advance and stored in a storage unit as data in the form of a map or the like.

Figure 6:
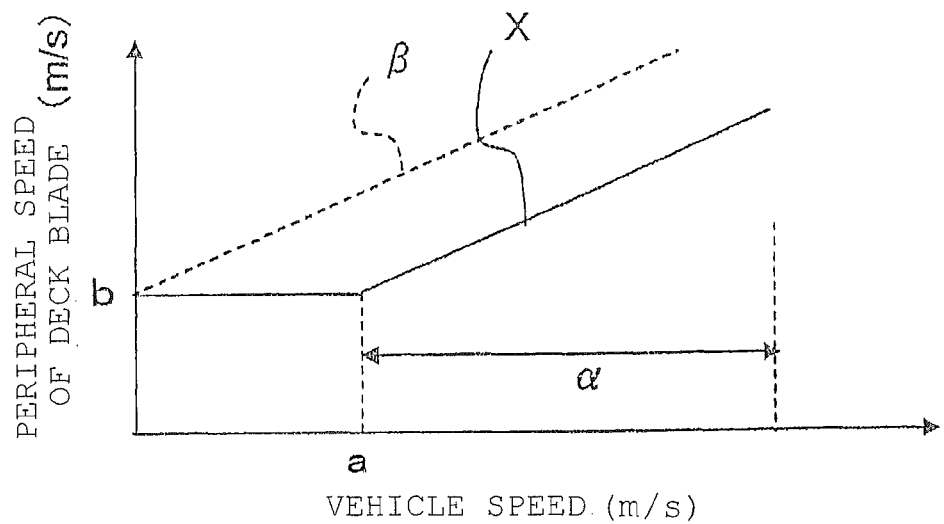
FIG. 6 is a diagram showing a relationship between vehicle speed and the peripheral speed of a deck blade corresponding to a mowing travelling cooperative relationship set in a nice-mode, in the embodiment.

FIG. 6 is a diagram showing an example of a relationship between vehicle speed and the peripheral speed of a deck blade corresponding to the mowing travelling cooperative relationship set in the nice-mode, in the present embodiment. The peripheral speed of a deck blade is determined according to the length of the deck blade provided in the vehicle, that is, the length from the rotation center of each cutting blade element to the tip, and the rotational speed of the deck motor 46. That is, the peripheral speed Bv (m/s) at the tip of each cutting blade element, which is the peripheral speed of the deck blade, is determined by the following formula, using the number of revolutions DMn per unit time (min$^{-1}$), which is the rotational speed of the deck motor 46, and the length VL (m) of the deck blade.

$$Bv=(DMn \times \pi \times VL)/60 \qquad (1)$$

Furthermore, the present inventor has defined a coefficient below called a "nice coefficient" as a coefficient indicating the neatness of the lawn after mowing, that is, the fineness of the state of the lawn. When the vehicle speed is given as CV (m/s), a nice coefficient Nk is defined by the following formula, using the peripheral speed Bv (m/s) of each cutting blade element.

$$Nk=Bv/CV \qquad (2)$$

Accordingly, the nice coefficient Nk is increased as the vehicle speed CV becomes lower, and is increased as the peripheral speed Bv of each cutting blade element is increased, and when the nice coefficient Nk is increased, that is, when the slope of the solid line X in FIG. 6 becomes steep, a fine lawn state can be achieved by efficient mowing, i.e. mowing over a short period of time. Also, the peripheral speed of the deck blade is low when the vehicle speed is low, and thus the energy consumption can be reduced compared to when the peripheral speed of the deck blade is increased regardless of the vehicle speed.

For example, the relationship between the vehicle speed and the peripheral speed of the deck blade is defined in the nice-mode as the solid line X, as an example, in FIG. 6, and based on this relationship, the "mowing travelling cooperative relationship", which is the relationship between the vehicle speed and the number of revolutions per unit time of the deck motor 46, is set. That is, with a vehicle, the length VL of the deck blade is uniquely determined, and thus the number of revolutions per unit time of the deck motor 46 is uniquely determined in accordance with the peripheral speed Bv of the deck blade. That is, the vertical axis in FIG. 6 may be replaced by the number of revolutions per unit time of the deck motor 46.

In this case, as is clear from FIG. 6, when the vehicle speed is below threshold speed a (m/s) set in advance, the number of revolutions per unit time of the deck motor 46 is a constant number of revolutions per unit time according to peripheral speed b of the deck blade in FIG. 6. Also, when the vehicle speed is at or above the threshold speed a (m/s), the number of revolutions per unit time of the deck motor 46 is linearly increased according to the increase in the vehicle speed. A range where the vehicle speed is at a or higher in FIG. 6 is the application range of the nice coefficient Nk (a range α in FIG. 6). That is, the rate change of the number of revolutions per unit time of the deck motor 46 with the vehicle speed where the vehicle speed is at a or higher is set in advance according to a constant nice coefficient Nk set in advance. Then, the ECU 50 causes the storage unit to store the "mowing travelling cooperative relationship" indicating the relationship between the vehicle speed and the number of revolutions per unit time of the deck motor 46, according to the relationship between the vehicle speed shown by the solid line X in FIG. 6 and the peripheral speed of the deck blade.

When switching to the nice-mode is performed, the mower-related control unit 74 of the ECU 50 sets the mower-related target rotational speed of the deck motor 46 according to the "mowing travelling cooperative relationship" described above, and performs control such that each deck motor 46 is driven at the mower-related target rotational speed which has been set. Therefore, when the vehicle speed is below a, each deck motor 46 rotates at constant rotational speed, but when the vehicle speed is at a or higher, the rotational speed of each deck motor 46 is increased according to the increase in the vehicle speed. According to the relationship between the vehicle speed and the peripheral speed of the deck blade, in the case the vehicle is moving forward, the number of revolutions per unit time of the deck motor 46 may be linearly increased according to the nice coefficient as the vehicle speed is increased from zero, as shown by the broken line β in FIG. 6. Moreover, the threshold speed a and the constant rotational speed b defined in FIG. 6 may be determined in the performance specification in advance by a vehicle manufacturer, a parts manufacturer or the like. Furthermore, the nice coefficient Nk may be set in advance by a vehicle manufacturer, a parts manufacturer or the like through tests, for example.

Furthermore, in FIG. 6, a case is described where the relationship between the vehicle speed and the peripheral speed of the deck blade and the number of revolutions per unit time of the deck motor 46 is defined according to the nice coefficient Nk, but the peripheral speed of the deck blade and the number of revolutions per unit time of the deck motor 46 may be linearly increased according to the increase in the vehicle speed by another coefficient. Also, the peripheral speed of the deck blade and the number of revolutions per unit time of the deck motor 46 may be increased curvilinearly according to the increase in the vehicle speed. In any case, in the mowing travelling cooperative relationship set in the nice-mode, the relationship between the mower-related target rotational speed of the deck motor 46 and the vehicle speed is set such that the mower-related target rotational speed is increased in accordance with the increase in the vehicle speed at least in a predetermined speed range with respect to the vehicle speed.

Moreover, in the above, the vehicle speed calculation unit 86 is to calculate the target vehicle speed and the actual vehicle speed, but it may be configured to calculate, at all times, only one of the target vehicle speed or the actual vehicle speed as the vehicle speed.

On the other hand, when switching to the economy mode is performed by the mode switch 76 in FIG. 5 mentioned above, and the deck switch 47 is turned on, the drive control unit 66 of the ECU 50 changes, i.e. reduces, maximum allowable speed of the target vehicle speed to economic maximum speed, which is lower than when in the nice-mode, set in advance, and controls the rotational speed of each of the drive motors 22 and 24 in such a way that the maximum speed of the vehicle will be at the economic maximum speed, and also, the mower-related control unit 74 controls each deck motor 46 to rotate at the high efficiency constant speed set in advance.

Figure 7:
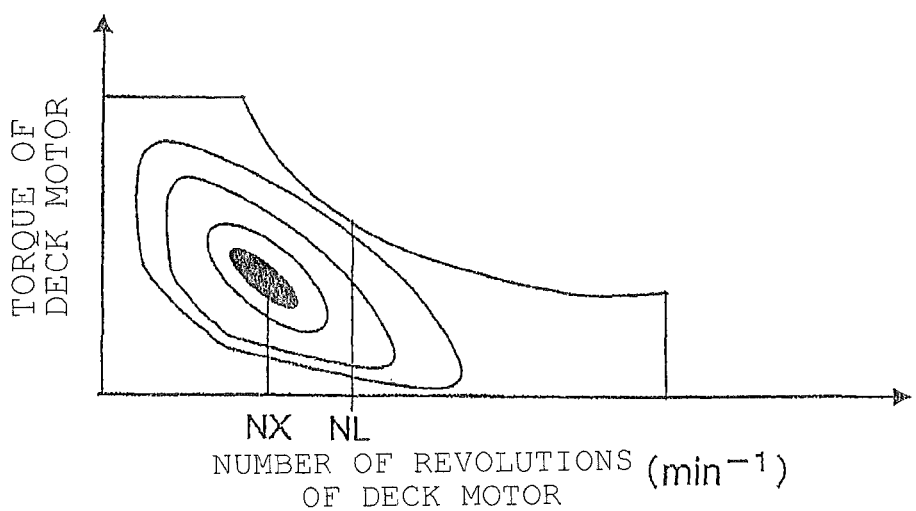
FIG. 7 is a diagram for describing the number of revolutions corresponding to a high efficiency constant speed of a deck motor set in an economy mode, in the embodiment.

FIG. 7 is a diagram for describing the number of revolutions per unit time corresponding to the high efficiency constant speed of the deck motor 46 set in the economy mode, in the present embodiment. FIG. 7 shows, by NL, the number of revolutions per unit time which is conventional mower-related target rotational speed set in a drive mode set in an example of a conventional riding mower. Also, in FIG. 7, a plurality of regions regarding the efficiency of the deck motor 46 are shown by contours, and it is indicated that the black part is a maximum efficiency region where the efficiency is the highest. The efficiency of the deck motor 46 changes according to the number of revolutions per unit time and torque in this manner. With a conventional riding mower, the number of revolutions per unit time of the deck motor 46 is sometimes set at a part outside the maximum efficiency region, as shown by NL in FIG. 7.

In contrast, in the present embodiment, in the case where the economy mode is instructed by the mode switch 76, the mower-related control unit 74 sets the mower-related target rotational speed to a high efficiency constant speed (NX in FIG. 7) which is possibly in the maximum efficiency region. In the case where one maximum efficiency point at which the motor efficiency is the highest is in the maximum efficiency region, the high efficiency constant speed may be the speed of the maximum efficiency point. Furthermore, the drive control unit 66 calculates, using formulae (1) and (2) mentioned above, the vehicle speed for a case where the mower-related target rotational speed is at the high efficiency constant speed in such a manner that the nice coefficient Nk set in advance is obtained, and sets the calculated vehicle speed as the economic maximum speed which is the maximum allowable speed. Accordingly, both at the time of travelling straight and at the time of turning, the allowed maximum rotational speeds for the rotational speed of the drive motors 22 and 24 are reduced compared to in the case of the nice-mode, and the allowable maximum speed of the vehicle is reduced compared to the nice-mode.

According to such a riding mower 10, a fine lawn state can be achieved by an efficient operation. That is, with the satisfaction of a predetermined condition where the nice-mode is selected by switching of the mode switch 76 by a user, the rotational speed of the deck motor 46 is increased according to the increase in the vehicle speed at least within a predetermined vehicle speed range of the riding mower 10. Accordingly, a desirable fine lawn state can be realized with a short period of operation time even when the vehicle speed is high, and also, since the rotational speed of the deck motor 46 is low when the vehicle speed is low, energy saving can be achieved. Furthermore, the riding mower 10 capable of achieving a fine lawn state with an efficient operation can be realized. As a result, the freedom of selection of vehicle performance by a user is increased, and a wider range of functionalities can be achieved by the riding mower 10. For example, if a user wants to finish the work before it starts raining, the user can do so by selecting the nice-mode, and a neat lawn can still be achieved. Also, conventionally, a user may have to adjust the vehicle speed while checking the lawn state after the mowing, but by causing the vehicle to perform this, the burden on the user can be reduced.

Furthermore, in the case where a user operates the mode switch 76 and switches to the economy mode, and the deck switch 47 is turned on, the rotational speed of the deck motor 46 is maintained at the high efficiency constant speed (NX in FIG. 7), and also, the maximum vehicle speed is set to the economic maximum speed, which is lower than where the nice-mode is selected. Accordingly, by allowing travelling at or below the maximum speed which is lower than where the nice-mode is selected, energy saving can be achieved. Also, a desirable fine lawn state can be realized with an efficient operation.

Figure 8:
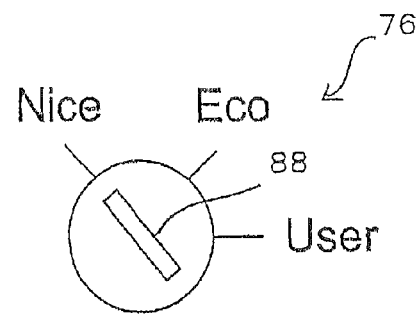
FIG. 8 is a diagram showing a first example which is another example of the mode switch.

Now, FIG. 8 is a diagram showing a first example which is another example of the mode switch 76. In the case of a riding mower of the present embodiment that uses the mode switch 76 of another example shown in FIG. 8, the mode switch 76 is enabled, in the embodiment in FIGS. 1 to 7 described above, to switch between three drive modes, i.e. the nice-mode, the economy mode and a user mode (a User position in FIG. 7), which is another drive mode, by an operation of a user. The mode switch 76 instructs switching of the mode by an operation of a user, and outputs an instruction signal indicating the specified mode to the ECU 50 (see FIG. 2). In the following description, an element that is the same, or corresponding to, an element shown in FIGS. 1 to 5 will be denoted with the same reference numeral.

When switching to the user mode is performed by the mode switch 76 in FIG. 8, and the deck switch 47 is turned on, the mower-related control unit 74 controls the operation of the deck motor 46 in such a way as to maintain the mower-related target rotational speed at the high efficiency constant speed described above (NX in FIG. 7) that is set in advance. This high efficiency constant speed is the same as that described above with reference to FIG. 7.

Unlike the economy mode, in the user mode, the allowable maximum rotational speed of each of the drive motors 22 and 24 does not become lower than in the nice-mode, and the allowable maximum speed of the vehicle is not reduced compared to the case of the nice-mode. Accordingly, in the case where a user operates the mode switch 76 and switches to the user mode, the fineness of the lawn after the same operation as in the economy mode may possibly be reduced compared to the case of the economy mode, but the maximum speed of the vehicle is higher than in the economy mode, and more comfortable travelling according to the intention of the user is achieved and the freedom of driving is increased. Also, since the deck motor 46 may be rotated at the high efficiency constant speed in the user mode, as in the economy mode, energy saving can be achieved. For example, comfortable travelling with reduced energy consumption can be provided to a user who mows for enjoyment. Other structures and effects are the same as those of the embodiment in FIGS. 1 to 7 described above.

Figure 9:
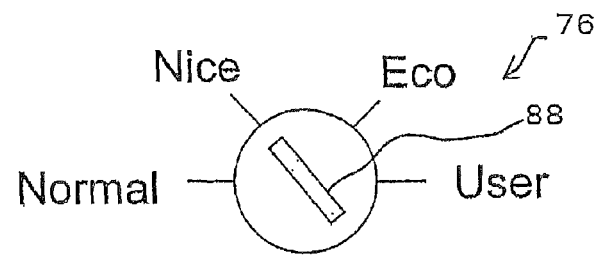
FIG. 9 is a diagram showing a second example which is another example of the mode switch.

Additionally, the mode switch 76 may also be configured as shown in FIG. 9. For example, in FIG. 9, it is possible to instruct switching between four drive modes, i.e. a normal mode (a Normal position in FIG. 9), the nice-mode, the economy mode and the user mode. In this case, when switching to the normal mode is performed, and the deck switch 47 is turned on, the speed of each deck motor 46 is maintained at a normal constant speed (NL in FIG. 7) higher than the high efficiency constant speed (NX in FIG. 7), which is the speed in the case of the economy mode and the user mode. Accordingly, the energy saving effect may possibly be reduced compared to the case of the economy mode and the user mode, but since the speed of the deck motor 46 is increased, the work can be finished more quickly. Additionally, the mode switch 76 in FIG. 9 described above may also be configured to be capable of switching between any two or three drive modes, and the ECU 50 may be configured to switch the drive mode according to the switching. For example, the riding mower may be configured to be capable of switching between the normal mode or the user mode and the economy mode.

Figure 10:
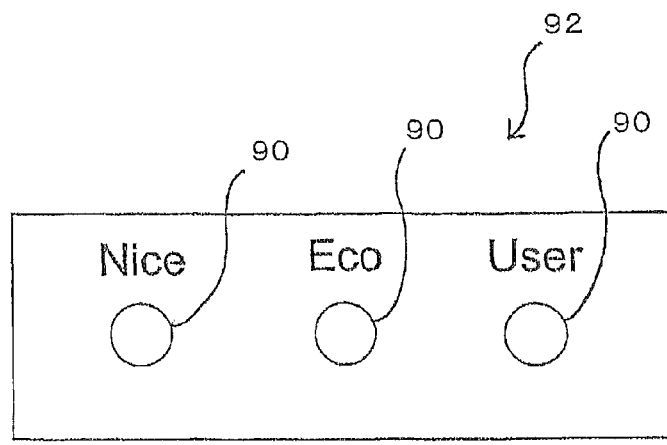
FIG. 10 is a diagram showing a third example which is another example of the mode switch.

Also, a mode instruction device is not limited to the mode switch 76 (FIG. 5, etc.) described above, and a mode setting device 92, as shown in FIG. 10, including push buttons 90 for the nice-mode, the economy mode and the user mode may be adopted as the mode instruction device, for example. The mode setting device 92 is also provided on the operation panel, for example. In the example in FIG. 10, the mechanisms of the push buttons 90 can be made to cooperate such that one of the nice-mode, the economy mode and the user mode is selected at any time. Also, in the case where none of the push buttons 90 is pressed, the ECU 50 may assume that the normal mode is specified and perform control which is to be performed when switching to the normal mode is performed. It is also possible to omit one or two buttons in FIG. 10 and to allow the riding mower to switch between two or three drive modes. Moreover, although not shown in the drawings, one of the modes described above may be instructed based on the operation position or the like of a mode switching lever supported on the vehicle in the periphery of a seat in a swingable manner.

In the above, when switching to the nice-mode is performed by the mode switch 76, it is assumed that a predetermined condition is satisfied, and the nice-mode is implemented, but the present invention is not limited to such a case. For example, the predetermined condition may be satisfied with the turning on of the key switch 68, that is, the ECU 50 may perform control such that the nice-mode is always implemented at the time of starting the vehicle. Also, a case is described above according to which a plurality of controllers, i.e. the ECU 50, the drive motor controllers 54 and 56, and deck motor controllers 52, are provided as the controllers, but the motor control system and the riding mower may be configured to have the ECU 50 and the drive motor controllers 54 and 56 or the deck motor controllers 52 integrated into one controller, or to have the ECU 50, the drive motor controllers 54 and 56, and the deck motor controllers 52 integrated into one controller. Also, a case is described above according to which the drive motors 22 and 24 and the deck motor 46 are electric motors, but the present invention can be applied in a case where one or both of the motors are hydraulic motors.

Now, a electric rotary machine, a electric rotary machine cooling system, and a riding mower which is a ground work vehicle, according to another embodiment will be described. The present embodiment has its advantage for solving the following issue. In a riding mower, a structure according to which a mower is rotated by an electric motor may cause performance deterioration when the temperature of the electric motor rises during use. Accordingly, realization of a structure capable of efficiently cooling the electric motor is desired. With a mower described in EP Patent Application Publication No. 0510279 A, a fan may be attached to the shaft of a motor and air is made to flow to the outside of the motor, but to sufficiently cool the motor, an air passage for efficiently blowing air onto the motor has to be provided. In this regard, the present inventor has assumed that by realizing a structure for efficiently cooling a motor using liquid coolant, the air passage can be eliminated or cooling can be performed more efficiently. Neither EP Patent Application Publication No. 0510279 A nor U.S. Pat. No. 6,434,918 discloses a structure for efficiently cooling a motor using liquid coolant. Additionally, a case is described above according to which the mower is driven by an electric motor, but another type of electric motor which is used by a ground work vehicle, such as the riding mower, to drive a driving wheel, for example, has room for improvement in the point of view of efficient cooling.

The advantage of the following embodiment is for realizing a structure capable of efficiently cooling an electric rotary machine using liquid coolant, with respect to an electric rotary machine, an electric rotary machine cooling system and a ground work vehicle.

In the following, a case is described according to which the ground work vehicle is a riding riding mower including a mower as a working implement, but the ground work vehicle is not limited thereto, and it may be a vehicle for performing an operation with respect to the ground, that is, ground work, such as a vehicle including a farming device, a vehicle including a seed-planting device, a vehicle including a ground leveling device, a vehicle including a hole-digging device or the like. The ground work vehicle may be a handheld lawnmower, which has a mower as a working implement. An worker carries the handheld lawnmower in his or her hands in order to mow a lawn while walking around a ground. In this case, the handheld lawnmower does not need to have drive motors which drive wheels.

Figure 11:
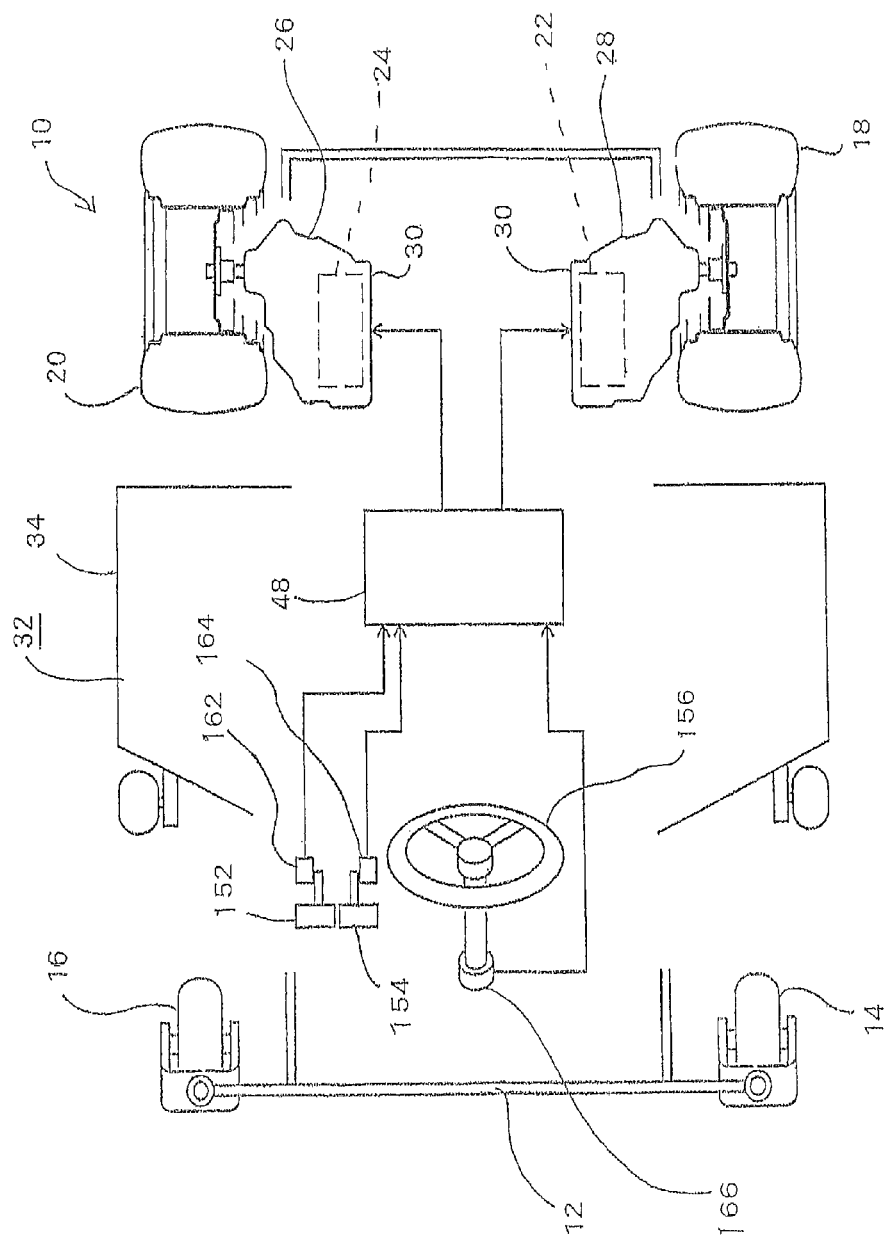
FIG. 11 is a schematic view of a structure, seen from above, of a riding mower which is a ground work vehicle of another embodiment.

FIGS. 11 to 15 show the other embodiment. FIG. 11 is a schematic view of a structure, seen from above, of a riding mower which is a ground work vehicle of the other embodiment. As shown in FIG. 11 and as with the riding mower 10 shown in FIG. 1 described above, a riding mower 10, which is a riding ground work vehicle, includes a main frame 12, two, left and right caster wheels 14 and 16, and two, left and right wheels 18 and 20. Additionally, in the following drawings and description, an element that is the same as an element shown in FIGS. 1 and 2 will be denoted with the same reference numeral. Left and right drive motors 22 and 24 are connected to the left and right wheels 18 and 20, respectively, via power transmission units including reduction mechanisms, not shown, so as to be able to transmit power.

Furthermore, each of the drive motors 22 and 24 is supplied with electrical power from a battery 36 (FIGS. 13 and 14), which is a DC power source for a motor, and is driven.

Figure 13:
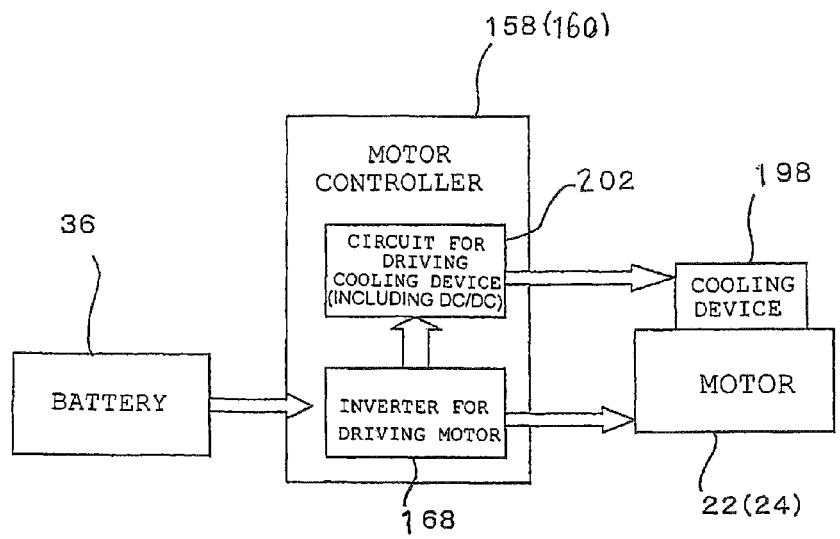
FIG. 13 is a block diagram showing a state where electrical power is supplied by a battery to a drive motor and a Peltier element at the time of normal travelling, in a motor cooling system of another embodiment.
Figure 14:
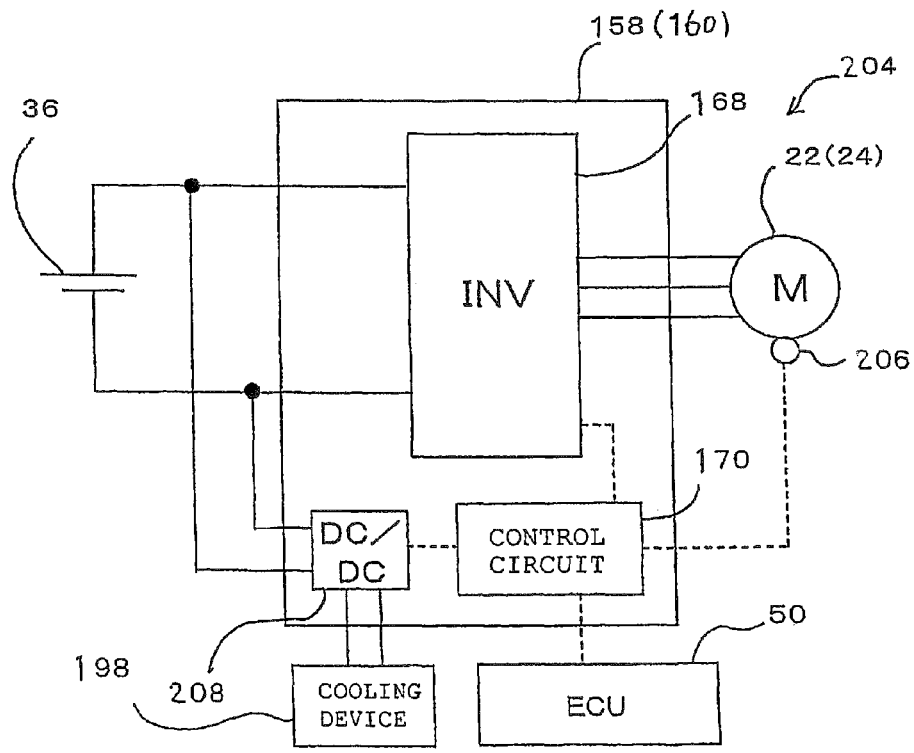
FIG. 14 is a circuit diagram of a motor cooling system of another embodiment.
Figure 17:
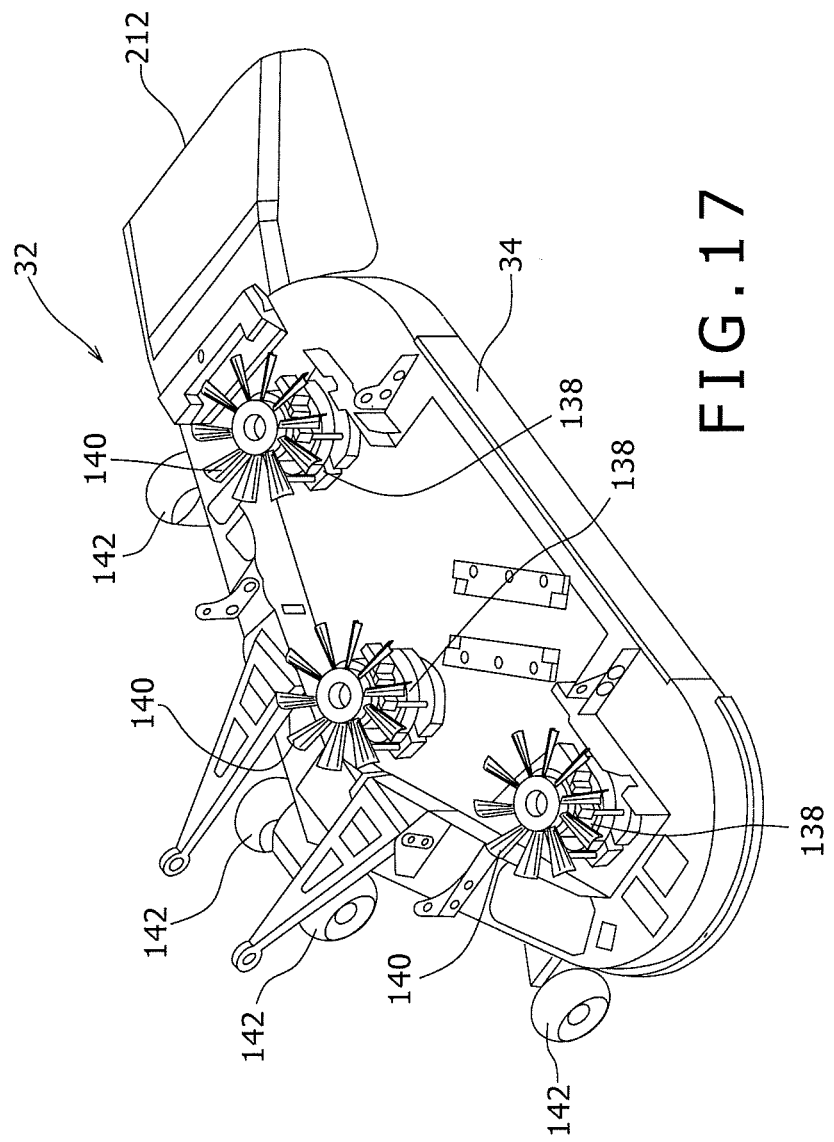
FIG. 17 is a perspective view showing a mower having attached thereto a deck motor which is a electric rotary machine of a second example which is another example of the embodiment in FIG. 12.

Furthermore, as shown in FIG. 17 for another embodiment described later, a rotating shaft, not shown, of a deck motor 138, which is an electric motor and which is a mower-related electric rotary machine, is coupled to a rotating shaft of the mower blade, not shown, provided inside a mower deck 34 in such a manner as to be able to transmit power. Additionally, in FIG. 17, three deck motors 138 are attached on the upper side of the mower deck 34, and a corresponding mower blade is arranged on the inside of the mower deck 34 below each deck motor 138. Moreover, in FIG. 17, a cooling fan 140 is attached to the upper side of the deck motor 138, but the cooling fan 140 may be omitted in the present embodiment. Each deck motor 138 is supplied with electrical power by the battery 36 (FIGS. 13 and 14). Also, a plurality of deck wheels 142 are attached to the mower deck 34.

Referring back to FIG. 11, when a signal indicating on or off of a deck switch (not shown) which is a mower start switch provided near a seat, not shown, provided on the upper side of the main frame 12 is input to an ECU 50 (FIG. 14), which is a higher level control unit constituting a controller unit 48, the ECU 50 outputs, based on this signal, an instruction signal to one or more deck motor controllers (not shown), which are lower level controllers, and controls the operation state of each deck motor 138 (see FIG. 17). That is, the deck motor controller includes a deck inverter for driving the deck motor 138, and a control circuit for controlling the deck inverter. The control circuit of the deck motor controller includes a CPU, a storage unit, such as a memory, and the like, and controls the operation of the corresponding deck motor 138 via the deck inverter, based on the signal input from the ECU 50. Each deck motor controller is connected to the ECU 50 by a signal cable. A mower 32 is driven in this manner to perform ground work.

The riding mower 10 mows the lawn by being driven by the deck motor 138, and ejects the cut grass from within the mower deck 34 through an outlet 212 (see FIG. 17) to a side of the vehicle in the width direction. A support portion, such as a plate portion, is fixed on the upper side of the main frame 12, not shown, for supporting the seat, accelerator pedals 152 and 154, operators, such as a steering operator 156, and the like.

The controller unit 48 described above is provided on the riding mower 10, and the ECU 50 (FIG. 14), which is the higher level control unit and which performs overall control of the drive motors 22 and 24 and the deck motor 138 (FIG. 17), and a left drive motor controller 158 and a right drive motor controller 160, which are lower level control units and which correspond to the left and right drive motors 22 and 24, respectively, are provided in the controller unit 48 in an integrated manner. Additionally, the deck motor controller may be provided integrally with the controller unit 48, and the motor controllers 158 and 160 and the ECU 50 may be arranged in the riding mower 10 in a separated manner.

Each of the drive motor controllers 158 and 160 is connected to the ECU 50 by a signal cable. That is, as shown in FIG. 11, a forward accelerator pedal 152 and a reverse accelerator pedal 154, which are acceleration instruction devices, are provided in front of a seat, and detection signals of accelerator sensors 162 and 164 for detecting the amount of operation of the accelerator pedals 152 and 154 are input to the ECU 50 (FIG. 14). Also, the steering operator 156, which is a turning instruction device and a steering wheel, is provided in front of the seat, and a detection signal of a steering sensor 166 for detecting the amount of steering and the steering direction of the steering operator 156 is also input to the ECU 50. The ECU 50 outputs corresponding instruction signals to the left and right drive motor controllers 158 and 160 based on the detection signals of the accelerator sensors 162 and 164 and the steering sensor 166 so as to cause the riding mower 10 to travel in the corresponding direction at a corresponding speed, and controls the rotational speed or torque of each of the drive motors 22 and 24. That is, as shown in FIGS. 13 and 14, each of the drive motor controllers 158 and 160 includes a drive inverter 168 for driving the corresponding drive motor 22 or 24, and a control circuit 170 (FIG. 14) for controlling the drive inverter 168. The drive inverter 168 converts DC electrical power output from the battery 36 into AC electrical power according to a control signal input from the control circuit 170 and outputs the AC electrical power to the corresponding drive motor 22 or 24. The control circuit 170 of each of the drive motor controllers 158 and 160 includes a CPU, a storage unit, such as a memory, and the like, and controls the corresponding drive motor 22 or 24 based on a signal input from the ECU 50 via the drive inverter 168.

A brake pedal, not shown, is also provided on the upper surface side of the main frame 12, and a detection signal of a brake sensor for detecting the amount of operation of the brake pedal is also input to the ECU 50. Braking is applied or released by turning on or off an electromagnetic brake provided in the periphery of the axle of the wheel 18 or 20 according to the signal of the brake sensor.

Figure 12:
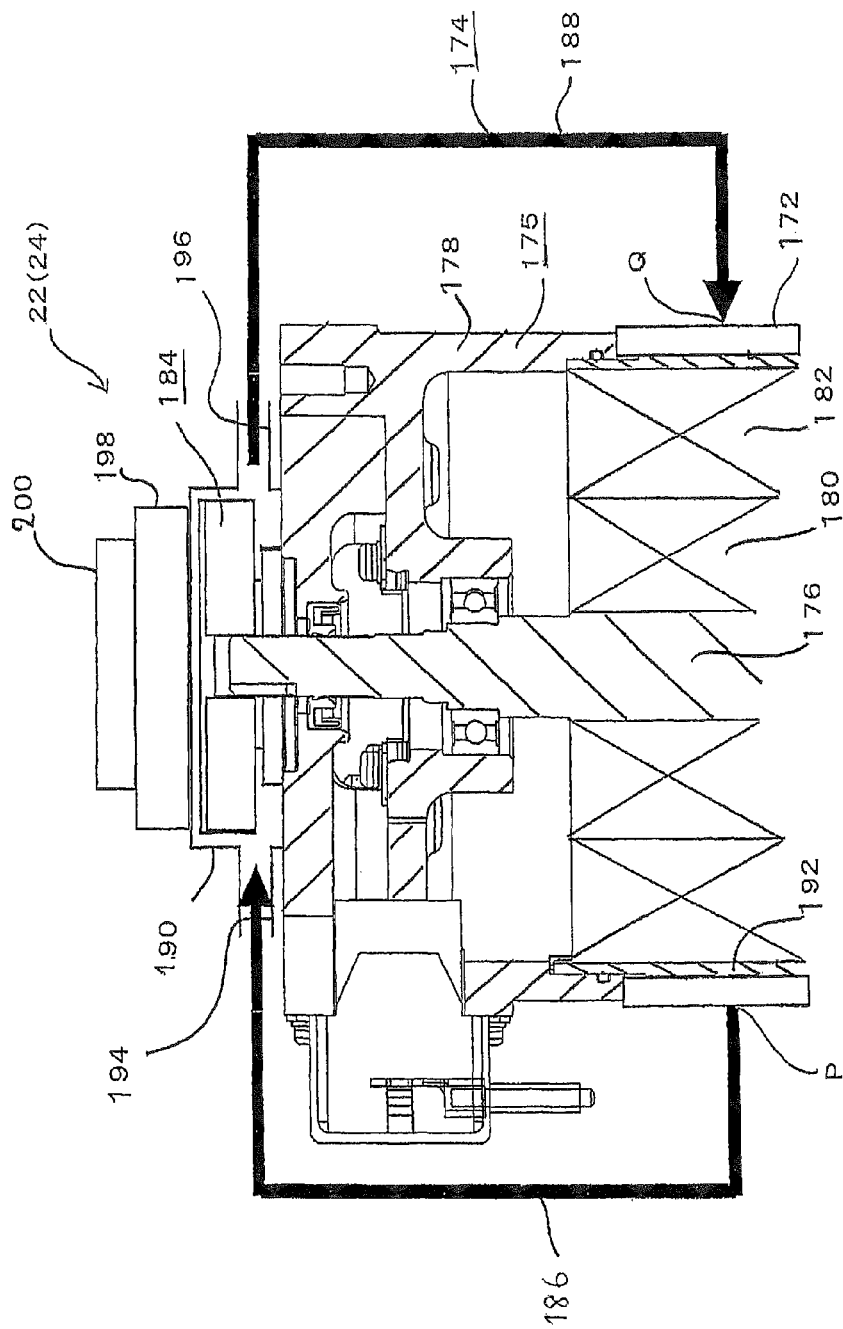
FIG. 12 is a schematic fragmentary sectional view of a drive motor which is a electric rotary machine in FIG. 11.

FIG. 12 is a schematic fragmentary sectional view of a drive motor which is the electric rotary machine in FIG. 11. As shown in FIG. 12, each drive motor 22 or 24 is a self-cooling type, and is structured to have a coolant circulation path 174 connected to a coolant container 172 provided in the periphery of the drive motor 22 or 24, to cause cooling oil, which is liquid coolant, to circulate through the coolant circulation path 174 in accordance with the rotation of a rotating shaft 176, and to perform cooling. That is, each of the drive motors 22 and 24 includes a motor main body 175, and the motor main body 175 includes the rotating shaft 176 supported inside a motor case 178 by a bearing in a rotatable manner, a rotor 180 fixed to the rotating shaft 176, and a stator 182 arranged, in a facing manner, on the outer side in the radial direction of the rotor 180 via an air gap. Also, each of the drive motors 22 and 24 includes a trochoidal pump 184, which is attached to an end portion in the axial direction of the rotating shaft 176 and which is a liquid coolant pump which is driven by the rotation of the rotating shaft 176 with a part of the rotating shaft 176 as a pump shaft, the coolant container 172, and two coolant pipes 186 and 188. The trochoidal pump 184 includes an outer rotor arranged inside a pump case 190, and an inner rotor eccentrically arranged, with respect to the outer rotor, inside the outer rotor, and the inner rotor is fixed to an end portion in the axial direction of the rotating shaft 176. The pump case 190 is fixed on the outer side surface of an end portion in the axial direction of the motor case 178. The rotating shaft 176 is not limited to be formed from one component, and it may be formed from a plurality of elements that are arranged coaxially and integrally coupled to each other.

The coolant container 172 is formed to have a substantially rectangular cross section and its inside is of a hollow circular shape, and is fitted and fixed to the outer circumferential surface of the motor case 178 which is on the outside of the stator 182 so as to encircle the whole circumference of at least a part of the stator 182 in the axial direction. The coolant container 172 is made of a material with good heat conductivity, such as metal, such as iron, aluminum alloy or the like, and is in contact with a stator core configuring the stator 182 via a case constituting member 192, also made of a material with good heat conductivity, constituting the motor case 178. The coolant container 172 includes a coolant outlet P and a coolant inlet Q at positions that are shifted in the circumferential direction, such as two positions on the opposite sides in the radial direction of the outer circumferential surface. The coolant container 172 is attached to the outer circumferential portion of the motor main body 175 in this manner. The coolant container 172 may also be fixed without using the motor case 178, by being in direct contact with the outside of the stator core.

Of the two coolant pipes 186 and 188, the coolant pipe 186 connects the coolant outlet P of the coolant container 172 to an intake port 194 facing outward in the radial direction of the trochoid pump 184, and the coolant pipe 188 connects the coolant inlet Q of the coolant container 172 to an exhaust port 196 facing outward in the radial direction of the trochoidal pump 184. Thus, the two coolant pipes 186 and 188 connect the coolant outlet P and the coolant inlet Q via the trochoidal pump 184, and form the coolant circulation path 174 by which cooling oil, which is liquid coolant, is circulated. The coolant circulation path 174 is formed by the coolant container 172, the two pipes 186 and 188, and the trochoidal pump 184. Accordingly, when the rotating shaft 176 of the drive motor 22 or 24 rotates, the inner rotor of the trochoidal pump 184 is rotated and the cooling oil is delivered to the coolant inlet Q from the coolant outlet P of the coolant container 172 sequentially through the coolant pipe 186 on one side, the trochoidal pump 184 and the coolant pipe 188 on the other side, and the coolant is made to circulate through coolant circulation path 174 by the repetition of the above. Additionally, in FIG. 12, the coolant pipes 186 and 188 are schematically shown with arrows, each of which indicates the direction of the flow of the coolant (the same can be said for FIG. 16).

Additionally, the shape of the coolant container 172 is not limited to a circular shape as described above, and it is sufficient if the coolant container 172 is attached to at least a part of the outer circumferential portion of the motor main body 175.

Furthermore, a Peltier element 198 which is a cooling device is attached to the outer side surface of the pump case 190 of the trochoid pump 184 (on the upper side surface in FIG. 12). When electrical power is supplied, one side of the Peltier element 198 is cooled and the other side is heated, and the Peltier element 198 is attached to the trochoidal pump 184 in such a way that the side to be cooled (the lower side in FIG. 12) faces and contacts the trochoidal pump 184. Moreover, a heat sink 200 is attached to the other side of the Peltier element 198, which is to be heated (the upper side in FIG. 12). That is, the Peltier element 198 and the heat sink 200 are stacked on the outside of the trochoidal pump 184, and the heat sink 200 is attached to the trochoidal pump 184 via the Peltier element 198.

FIG. 13 is a block diagram showing a state where electrical power is supplied by a battery to a drive motor and a Peltier element at the time of normal travelling, in a motor cooling system of the present embodiment. As shown in FIG. 13, the DC electrical power output from the battery 36 is converted into AC electrical power by the drive inverter 168 provided in the drive motor controller 158 or 160, and the voltage is then converted, that is, stepped down, by a drive circuit 202 including a DC/DC converter and a control circuit, and the electrical power is supplied to the Peltier element 198. To this end, the motor cooling system, which is the electric rotary machine cooling system of the present embodiment, has a circuit structure as shown in FIG. 14. FIG. 14 is a circuit diagram of the motor cooling system of the present embodiment. As shown in FIG. 14, a motor cooling system 204 includes drive motors 22 and 24, the battery 36, which is a DC power source for a motor, for driving the Peltier element 198, the ECU 50 for controlling the supply state of electrical power from the battery 36 to the Peltier element 198, and a temperature sensor 206, which is a temperature detection unit for detecting the temperature of the drive motors 22 and 24, for example, the temperature of a stator core and a stator coil. The detected temperature of the temperature sensor 206 is input to the control circuit 170 of the corresponding drive motor controller 158 or 160 through a signal line, and is further transmitted to the ECU 50.

Also, the motor cooling system 204 includes a DC/DC converter 208, which is a voltage conversion unit that is connected in parallel with the drive inverter 168 between the battery 36 and the drive inverter 168. The DC/DC converter 208 performs voltage conversion according to a control signal from the control circuit 170 in such a way that the electrical power supplied by the battery 36 or the drive inverter 168 is stepped down from a high voltage, such as 48 V, to a low voltage, such as 12 V, supplies the electrical power after voltage conversion to the Peltier element 198, and drives the Peltier element 198. When the Peltier element 198 is driven, the heat of the trochoidal pump 184 is absorbed and moved to the heat sink 200 side, and thus the oil, whose temperature has risen, can be cooled passing through the trochoidal pump 184. The Peltier element 198 can be driven in this manner by the battery 36, which is the same drive source as that of the drive motors 22 and 24, and the like, using the DC/DC converter 208.

Furthermore, the ECU 50 stores the temperature of the drive motor 22 or 24 detected by the temperature sensor 206 in a storage unit, and when the temperature is at or below a predetermined temperature set in advance, stops the supply of electrical power from the battery 36 to the Peltier element 198 by controlling the DC/DC converter 208, for example. On the other hand, in the case where the temperature of the drive motors 22 or 24 exceeds the predetermined temperature, the ECU 50 causes the battery 36 to supply electrical power to the Peltier element 198, and drives the Peltier element 198. Accordingly, the oil passing through the trochoidal pump 184 can be cooled. Moreover, each of the drive motor controllers 158 and 160 is formed as one unit with the corresponding drive inverter 168, the control circuit 170 for controlling the drive inverter 168, and the DC/DC converter 208. For example, the drive inverter 168, the control circuit 170 and the DC/DC converter 208 may be embedded in a single case constituting the drive motor controller 158 or 160. In this case, the space can be saved.

Additionally, a detection signal of the temperature sensor 206 may also be directly transmitted to the ECU 50 without using the drive motor controller 158 or 160, and the temperature of the drive motor 22 or 24 may be monitored by the ECU 50. Also, by providing a relay between the battery 36 and the DC/DC converter 208 and causing the ECU 50 to turn the relay on or off, switching between electrical power supply from the battery 36 to the Peltier element 198 and interruption of electrical power supply is enabled.

Such a motor cooling system 204 is used being mounted on the riding mower 10. Also, the riding mower 10 may allow regenerative braking when a predetermined condition set in advance, such as turning off of an accelerator pedal 152 or 154 during travelling, is satisfied. That is, when the ECU 50 determines, based on a signal from an accelerator sensor 162 or 164, or the like, that the condition for the regenerative braking is satisfied, each of the drive motors 22 and 24 is made to serve the function of a generator, regenerative electrical power is collected from each of the drive motors 22 and 24 that are driven from the ground via the wheels 18 and 20, and the battery 36 can be charged.

Figure 15:
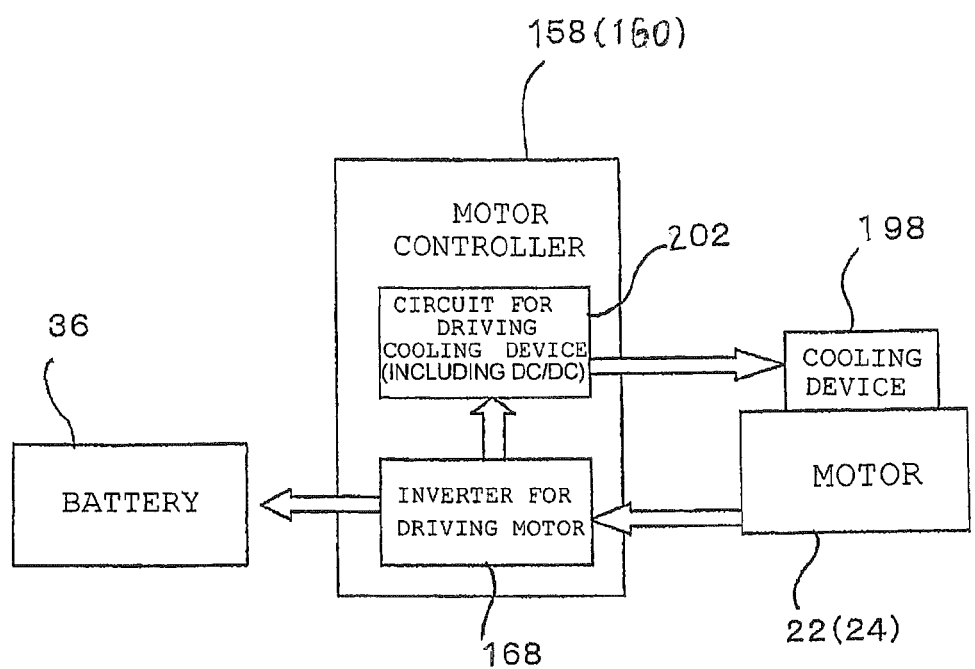
FIG. 15 is a block diagram showing a state where electrical power is supplied by the drive motor to the Peltier element and the battery at the time of regenerative braking, in a motor cooling system of another embodiment.

FIG. 15 is a block diagram showing a state where electrical power is supplied by the drive motor to the Peltier element and the battery at the time of regenerative braking, in the motor cooling system of the present embodiment. As shown in FIG. 15, at the time of regenerative braking, electrical power is supplied to the battery 36 from the drive motor 22 or 24 via the corresponding drive inverter 168. In this case, the ECU 50 (FIG. 14) controls the drive motor controllers 158 and 160 in such a manner that regenerative power is collected from the drive motors 22 and 24 that are driven by the left and right wheels 18 and 20, and the collected power is supplied to the battery 36. Furthermore, the ECU 50 drives each Peltier element 198 using the regenerative power collected from the drive motor 22 or 24. Therefore, even at the time of regenerative braking, the Peltier element 198 can be driven without using the electrical power of the battery 36, the electrical power consumption can be reduced, and the travelling distance of the vehicle can be increased.

In this way, according to the drive motors 22 and 24, the motor cooling system 204 including the drive motors 22 and 24, and the riding mower 10, it is possible for the drive motors 22 and 24 to be efficiently cooled by the cooling oil, which is liquid coolant. That is, since each of the drive motors 22 and 24 includes the trochoidal pump 184, the coolant container 172, and the coolant pipes 186 and 188, the trochoidal pump 184 is automatically driven by the rotation of the drive motor 22 or 24, and the cooling oil can be circulated through the coolant circulation path 174 including the coolant container 172. Thus, even if the Peltier element 198 is not provided, or the Peltier element 198 is not being driven, the heat of the cooling oil can be released while the cooling oil is flowing through the coolant pipes 186 and 188, and the cooling oil can be cooled and the stator 182 that is in contact with the coolant container 172 via the motor case 178 can be cooled. It is therefore desirable that the coolant pipes 186 and 188 are made of a material with good heat conductivity, such as metal, such as iron. Also, since the circular coolant container 172 is fitted and fixed to the outer circumferential portion of the motor main body 175, the drive motor 22 or 24 can be efficiently cooled equally in the circumferential direction.

Furthermore, since the drive motors 22 and 24 are cooled by the cooling oil, air passages for efficiently blowing air onto the drive motors 22 and 24 do not have to be provided, unlike the case where air has to be blown onto the drive motors 22 and 24. Also, since the trochoidal pump 184 is used as a coolant pump, the intake port 194 and the exhaust port 196 can be provided facing outward in the radial direction, the thickness in the axial direction can be reduced and the space can be saved.

Moreover, there is no need to supply electrical power from outside to drive the trochoid pump 184. Also, since the Peltier element 198 and the heat sink 200 are provided in each of the drive motors 22 and 24, the cooling performance can be further enhanced.

Furthermore, the motor cooling system 204 includes the temperature sensor 206, and the drive motor controller 158 or 160, or the ECU 50, switches between electrical power supply from the battery 36 to the Peltier element 198 and interruption of the electrical power supply according to the temperature of the drive motor 22 or 24. Accordingly, the electrical power consumption can be suppressed, and the drive motor 22 or 24 can be more efficiently cooled. Additionally, if the increase in the electrical power consumption is acceptable, the motor cooling system does not have to include the function of switching between electrical power supply from the battery 36 to the Peltier element 198 and interruption of the electrical power supply based on a signal from the temperature sensor 206. That is, the motor cooling system may adopt a configuration according to which the Peltier element 198 is constantly being driven during normal travelling.

Moreover, in the above, the trochoidal pump 184 is used as the liquid coolant pump, but the present embodiment is not thus limited, and various other types of pumps, such as a gear pump, for example, may be used. Also, a case is described above where the drive motors 22 and 24 are cooled using oil as the liquid coolant, but besides oil, various other types of liquid coolant, such as water, LLC and the like, may be used as the liquid coolant. Furthermore, a case is described above where the ECU 50 and the drive motor controllers 158 and 160 are integrally configured as the controller unit 48, but at least one of the ECU 50 and the drive motor controllers 158 and 160 may be provided separately to the vehicle. Also, a case is described above where a plurality of controllers, the ECU 50 and the controllers 158 and 160, are provided as the controllers, but in the motor cooling system, it is possible to provide only one controller and cause this single controller to serve the functions of the ECU 50 and other controllers (for example, the drive motor controllers 158 and 160).

Furthermore, a case is described above where acceleration and turning of the vehicle is instructed by using the accelerator pedals 152 and 154 and the steering operator 156, but the riding mower 10 of the present embodiment may include a left and right lever-type operator having two left and right operation levers provided on both sides of the vehicle in the width direction, which is the left to right direction of a seat (the up and down direction in FIG. 11), and may cause the left and right lever type operator to serve the functions of both the acceleration instruction device and the turning instruction device.

Still further, a case is described above where the drive motors 22 and 24 are cooled by liquid coolant, but other motors, such as the deck motors 138 and the like, may be cooled in the same manner together with the drive motors 22 and 24, or without cooling the drive motors 22 and 24. In the case of cooling the deck motor 138, a liquid coolant pump, such as the trochoidal pump 184 or the like, the coolant container 172 and the coolant pipes 186 and 188 are attached to the deck motor 138 as in the case of the drive motors 22 and 24. In this case, as the motor cooling system, a DC/DC converter may be provided in the deck motor controller, and electrical power from the battery 36 may be supplied to the Peltier element after being stepped down by the DC/DC converter. Other structures and effects are the same as for the drive motors 22 and 24 and the motor cooling system 204.

Figure 16:
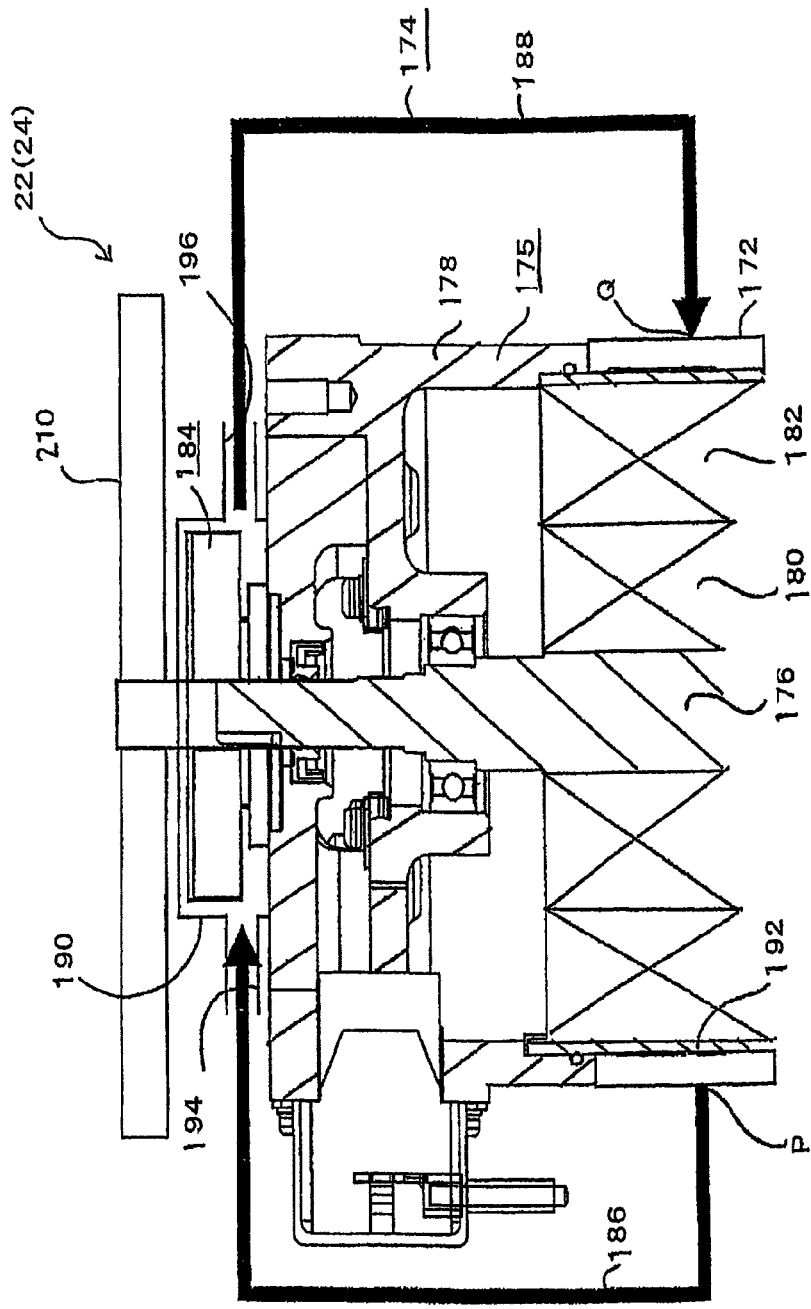
FIG. 16 is a schematic fragmentary sectional view of a drive motor which is a electric rotary machine of a first example which is another example of the embodiment in FIG. 12.

Now, FIG. 16 is a fragmentary sectional view of a drive motor which is a electric rotary machine of a first example which is another example of the embodiment in FIG. 12. In the embodiment shown in FIG. 16, unlike the embodiment described above, a Peltier element 198 and a heat sink 200 are not stacked outside a trochoidal pump 184 for drive motors 22 and 24. Instead, one end portion in the axial direction of a rotating shaft 176 of each of the drive motors 22 and 24 is made to protrude from the outer side surface of a pump case 190 of the trochoidal pump 184, and a cooling fan 210 is attached and fixed to the protruding portion. That is, the drive motors 22 and 24 each include the cooling fan 210 attached on the outer side of the trochoidal pump 184 at one end portion of the rotating shaft 176 in the axial direction. When the cooling fan 210 is driven, the flow of air (the blown air) is blown onto the outside of each of coolant pipes 186 and 188 connecting the pump case 190 and a coolant container 172. Furthermore, the flow of air caused by the cooling fan 210 is made to flow outside a motor case 178 toward the lower side in FIG. 16.

According to the configuration described above, cooling oil flowing through the coolant pipes 186 and 188 can be cooled using the cooling fan 210, and unlike a Peltier element, connection to a power source via an electrical power line is not necessary. Accordingly, air can be blown without supplying power for driving the cooling fan 210 from outside, and the drive motors 22 and 24 can be efficiently cooled by the cooling oil. Moreover, the motor case 178 is also cooled by the flow of air (the blown air) caused by the cooling fan 210, and the drive motors 22 and 24 can be more efficiently cooled. Additionally, also in the present embodiment, liquid coolant other than the cooling oil may be used, and a liquid coolant pump other than the trochoidal pump 184 may be used. Also, other motors, such as a deck motor 138 or the like, may be cooled in the same manner using the liquid coolant pump and the cooling fan 210.

Figure 18:
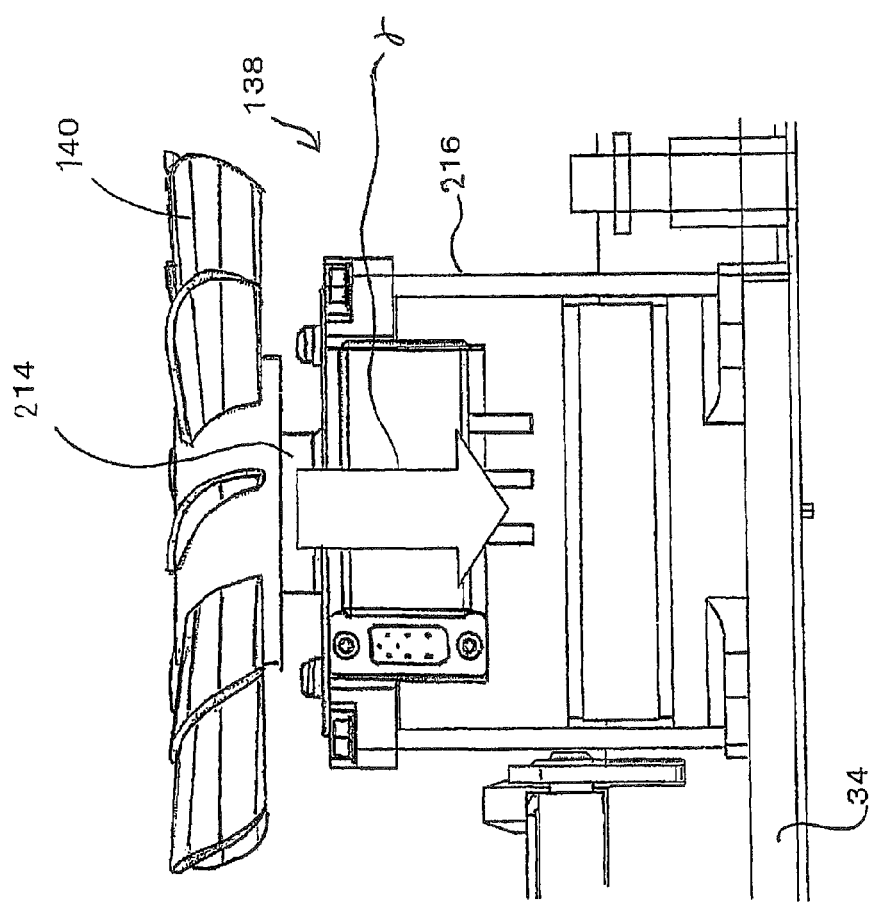
FIG. 18 is a side view of one deck motor in FIG. 17.

Now, FIG. 17 is a perspective view showing a mower having attached thereto a deck motor which is a electric rotary machine of a second example which is another example of the embodiment in FIG. 12. FIG. 18 is a side view of one deck motor in FIG. 17. In the embodiment shown in FIGS. 17 and 18, three deck motors 138 are attached on the upper side of a mower deck 34. Each deck motor 138 rotates around a mower blade, not shown, provided inside the mower deck 34 as a vertical axis. A rotating shaft 214 of each deck motor 138 is in the vertical direction. Also, lawn grass cut within the mower deck 34 is ejected to a side of the vehicle in the width direction through an outlet 212 provided on the side (the right side in FIG. 17) of the mower deck 34.

Also, in the embodiment shown in FIGS. 17 and 18, a trochoidal pump is not attached to the deck motor 138, and the deck motor 138 is not cooled by cooling oil. Instead, a cooling fan 140 is attached at an upper end portion of the rotating shaft 214 of the deck motor 138.

That is, as shown in FIG. 18, an upper end portion of the rotating shaft 214 is made to protrude from the upper side surface of a motor case 216 constituting the deck motor 138 at the upper end portion of the rotating shaft 214 of the deck motor 138, and the cooling fan 140 is fixed to the protruding portion. When the deck motor 138 rotates at the time of a mowing operation by the mower, the cooling fan 140 is also rotated, and the flow of air (the blown air) caused by the rotation moves in the periphery of the motor case 178 from above to below, as shown by an arrow y in FIG. 18. A stator 182 inside can thereby be cooled via the motor case 178. Accordingly, the deck motor 138 can be efficiently cooled with a relatively simple structure. Also, air can be made to flow without supplying power for driving the cooling fan 140 from outside. Furthermore, since the blown air flows downwards, the grass which has been cut by the mower blade is less likely to be blown up. Other structures and effects are the same as those of the embodiment in FIGS. 11 to 16 described above.

Figure 19:
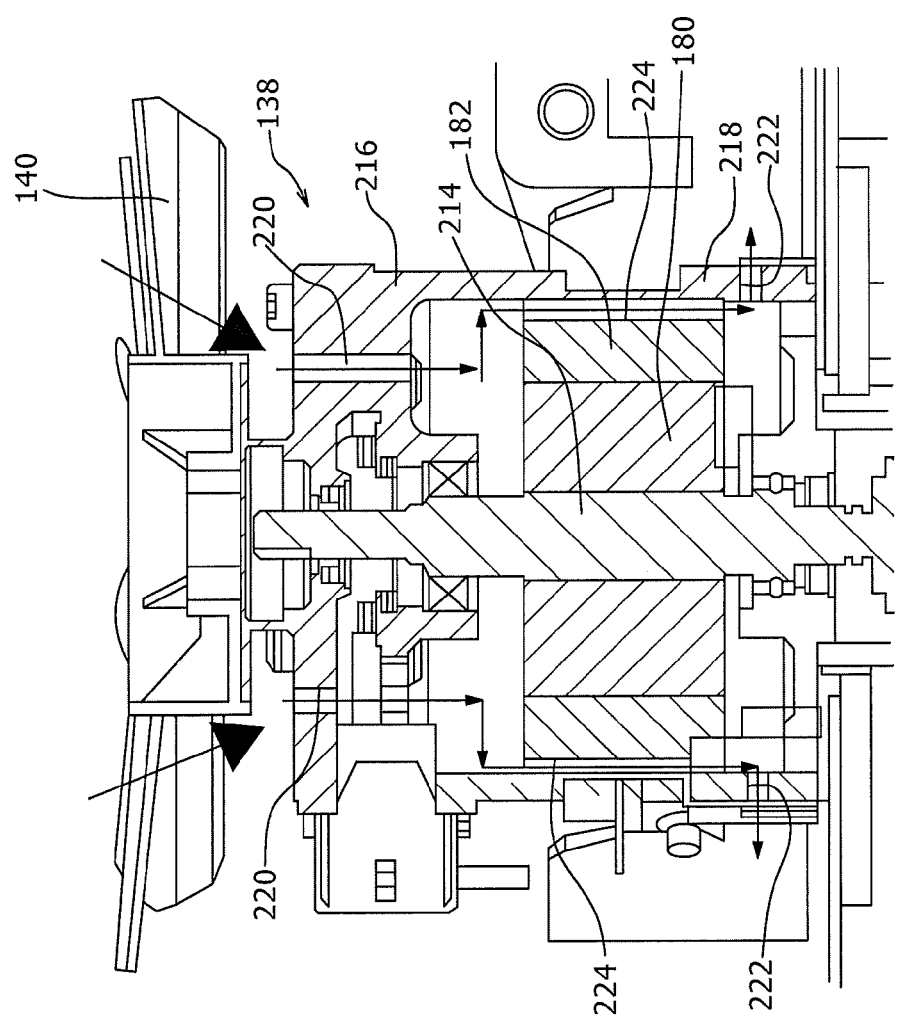
FIG. 19 is a schematic sectional view showing a deck motor which is a electric rotary machine of a third example which is another example of the embodiment in FIG. 12.

Now, FIG. 19 is a sectional view showing a deck motor which is a electric rotary machine of a third example which is another example of the embodiment in FIG. 12. As in the embodiment in FIGS. 17 and 18, in the embodiment in FIG. 19, a cooling fan 140 is fixed to an upper end portion of a rotating shaft 214 of a deck motor 138, and air holes 220 and 222 are formed at the upper end portion of a motor case 216 of the deck motor 138 and at two positions, of a cylinder 218 configuring the motor case 216, that are shifted in the circumferential direction (for example, at two positions on the opposite sides in the radial direction), the air holes being formed in such a way as to communicate the inside and the outside of the motor case 216. Air blown by the driving of the cooling fan 140 flows through the inside of the motor case 216 through the air hole 220 at the upper end portion, and flows to the lower side of a stator core constituting a stator 182 through an axial direction passage 224 formed in at least one of the inner circumferential surface of the motor case 216 and the outer circumferential surface of the stator core. Also, the blown air is discharged outside of the motor case 216 through the air hole 222 on the lower side. Accordingly, the stator 182 can be more efficiently cooled by the air flowing inside the motor case 216. Additionally, the position for forming the air hole 222 for discharging air is not limited to the position described above, and the air hole 222 may be formed at various positions other than the upper end portion of the motor case 216. Additionally, in the example in FIG. 19, to more effectively prevent foreign matter, such as lawn grass, entering the inside of the motor case 216 through the air holes 220 and 222, a filter may be provided in the periphery of each of the air holes 220 and 222 on the inside or outside of the motor case 216. Other structures and effects are the same as those of the embodiment in FIGS. 17 and 18 described above.

According to at least one of the work vehicles of the embodiments described above, the configuration of the first work vehicle described above is adopted. Thus, the work vehicle capable of obtaining a desirable after-operation state, for example, a lawn state, with an efficient operation can be realized. For example, in the case that a predetermined condition is satisfied, the rotational speed of a working implement-related motor is increased according to the increase in the vehicle speed at least within a predetermined vehicle speed range of the work vehicle. Accordingly, a desirable fine lawn state can be realized with a short period of operation time even when the vehicle speed is high, and also, since the rotational speed of the working implement-related motor is low when the vehicle speed is low, energy saving can be achieved. Also, a work vehicle capable of obtaining a fine lawn state with an efficient operation can be realized.

According to at least one of the work vehicles of the embodiments described above, the configuration of the second work vehicle described above is adopted. Thus, in the case where a user operates a mode instruction device and switches to the economy mode, and a working implement start switch is turned on, the rotational speed of a working implement-related motor is maintained at a constant speed and the maximum vehicle speed is changed to the economic maximum speed, which is lower than where another drive mode is specified, and accordingly, energy saving can be achieved by allowing travelling at or below the maximum speed which is lower than where another drive mode is specified. Also, a work vehicle capable of obtaining a fine after-operation state, for example, a lawn state, with an efficient operation can be realized.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A work vehicle comprising:
   a driving wheel motor structured to drive at least one driving wheel;
   a working implement-related motor structured to drive at least one working implement;
   at least one controller;
   at least one operator sensor structured to detect an amount of operation of at least one operator;
   a mode instruction device structured to instruct switching between a working travelling cooperative mode and at least one other drive mode based on a switching operation of a user; and
   a working implement start switch structured to instruct start of the working implement-related motor based on a starting operation of the user,
   wherein the at least one controller comprises:
      a drive control unit structured to control operation of the driving wheel motor based on a signal from the at least one operator sensor;
      a vehicle speed calculation unit structured to calculate a vehicle speed of the work vehicle; and
      a working implement-related control unit structured to control operation of the working implement-related motor;
   wherein the mode instruction device is structured to instruct switching between the working travelling cooperative mode and an economy mode based on the switching operation of the user, the working travelling cooperative mode and the economy mode, each of which sets a working implement-related target rotational speed employed when the working implement-related motor is driven;

wherein, when switching to the working travelling cooperative mode is performed by the mode instruction device, the working implement-related control unit sets a relationship between a target vehicle speed and the working implement-related target rotational speed to a working travelling cooperative relationship in which the working implement-related target rotational speed of the working implement-related motor is increased according to the increase in the target vehicle speed of the work vehicle at least in a predetermined vehicle speed range of the work vehicle, and controls the working implement-related motor to implement the working travelling cooperative mode; and wherein, when switching to the economy mode is performed by the mode instruction device, and the working implement start switch is turned on, the drive control unit changes allowable maximum speed of the target vehicle speed to economic maximum speed that is lower than when switching to the working travelling cooperative mode is performed and controls rotational speed of the driving wheel motor, and the working implement-related control unit controls the working implement-related motor to rotate at a constant working implement-related rotational speed set in advance.

2. A work vehicle comprising:
a driving wheel motor for structured to drive at least one driving wheel;
a working implement-related motor for structured to drive at least one working implement;
at least one controller;
at least one operator sensor for structured to detect an amount of operation of at least one operator;
a mode instruction device structured to instruct switching between a working travelling cooperative mode and at least one other drive mode based on a switching operation of a user; and
a working implement start switch structured to instruct start of the working implement-related motor based on a starting operation of the user,
wherein the at least one controller comprises:
    a drive control unit structured to control operation of the driving wheel motor based on a signal from the at least one operator sensor;
    a vehicle speed calculation unit structured to calculate a vehicle speed of the work vehicle; and
    a working implement-related control unit structured to control operation of the working implement-related motor;
wherein the mode instruction device is structured to instruct switching between the working travelling cooperative mode, an economy mode and a user mode based on the switching operation of the user, the working travelling cooperative mode and the user mode, each of which sets a working implement-related target rotational speed employed when the working implement-related motor is driven;
wherein, when switching to the working travelling cooperative mode is performed by the mode instruction device, the working implement-related control unit sets a relationship between a target vehicle speed and the working implement-related target rotational speed to a working travelling cooperative relationship in which the working implement-related target rotational speed of the working implement-related motor is increased according to the increase in the target vehicle speed of the work vehicle at least in a predetermined vehicle speed range of the work vehicle, and controls the working implement-related motor to implement the working travelling cooperative mode;

wherein, when switching to the economy mode is performed by the mode instruction device, and the working implement start switch is turned on, the drive control unit changes allowable maximum speed of the target vehicle speed to an economic maximum speed that is lower than when switching to the working travelling cooperative mode is performed and controls rotational speed of the driving wheel motor, and the working implement-related control unit controls the working implement-related motor to rotate at a constant first working implement-related rotational speed set in advance, and wherein, when switching to the user mode is performed by the mode instruction device, and the working implement start switch is turned on, the at least one controller controls the working implement-related motor to rotate at a constant second working implement-related rotational speed set in advance.

3. The work vehicle according to claim 1, comprising:
a rotational speed detection unit for detecting rotational speed of the driving wheel motor,
wherein the vehicle speed calculation unit calculates the vehicle speed based on a detection signal from the rotational speed detection unit.

4. The work vehicle according to claim 1, comprising:
a rotational speed detection unit for detecting rotational speed of the driving wheel motor,
wherein the vehicle speed calculation unit calculates target vehicle speed of the work vehicle based on a signal from the at least one operator sensor and calculates actual vehicle speed of the work vehicle based on a detection signal from the rotational speed detection unit, and when a speed difference between the target vehicle speed and the actual vehicle speed is at or below a threshold speed for vehicle speed calculation, calculates the target vehicle speed or the actual vehicle speed as the vehicle speed to be used for setting of the working travelling cooperative relationship, and when the speed difference between the target vehicle speed and the actual vehicle speed exceeds the threshold speed for vehicle speed calculation, calculates the actual vehicle speed as the vehicle speed to be used for setting of the working travelling cooperative relationship.

5. The work vehicle according to claim 1, wherein the working traveling cooperative relationship is a relationship according to which the working implement-related target rotational speed of the working implement-related motor is maintained to be constant when the vehicle speed of the work vehicle is below a threshold speed.

6. The work vehicle according to claim 1,
wherein the at least one controller determines a peripheral speed at the tip of the mower blade according to the rotational speed of the working implement-related motor, and controls the working implement-related motor such that the working implement-related target rotational speed of the working implement-related motor is linearly increased by a constant predetermined coefficient in response to the increase in the vehicle speed when the vehicle speed is at or above the threshold speed, the predetermined coefficient being equal to a value of the peripheral speed divided by the vehicle speed.

* * * * *